United States Patent
Pfeiffer et al.

(10) Patent No.: US 11,966,053 B2
(45) Date of Patent: Apr. 23, 2024

(54) OPTICAL SYSTEM WITH DISPERSION COMPENSATION

(71) Applicant: Apple Inc., Cupertino, CA (US)

(72) Inventors: Jonathan B. Pfeiffer, Lafayette, CO (US); Adam C. Urness, Louisville, CO (US); Friso Schlottau, Lyons, CO (US); Mark R. Ayres, Boulder, CO (US); Vikrant Bhakta, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 365 days.

(21) Appl. No.: 16/714,530

(22) Filed: Dec. 13, 2019

(65) Prior Publication Data

US 2020/0117003 A1     Apr. 16, 2020

Related U.S. Application Data

(63) Continuation-in-part of application No. 16/609,716, filed as application No. PCT/US2018/053192 on Sep. 27, 2018.
(Continued)

(51) Int. Cl.
*G02B 27/01* (2006.01)
*F21V 8/00* (2006.01)
(Continued)

(52) U.S. Cl.
CPC ....... *G02B 27/0103* (2013.01); *G02B 6/0016* (2013.01); *G02B 6/0026* (2013.01);
(Continued)

(58) Field of Classification Search
CPC .... G02B 2027/0174; G02B 2027/0178; G02B 2027/0172; G02B 2027/0138;
(Continued)

(56) References Cited

U.S. PATENT DOCUMENTS

| 4,405,941 A | 9/1983 | Mecklenborg |
| 7,418,170 B2 | 8/2008 | Mukawa et al. |

(Continued)

FOREIGN PATENT DOCUMENTS

| JP | 09106569 A | * | 4/1997 |
| JP | 09230320 A | | 9/1997 |

(Continued)

*Primary Examiner* — Thomas A Hollweg
*Assistant Examiner* — Mary A El-Shammaa
(74) *Attorney, Agent, or Firm* — Michael H. Lyons

(57) ABSTRACT

Systems and methods of dispersion compensation in an optical device are disclosed. A holographic optical element may include a set of different holograms in a grating medium. Each hologram in the set may have a corresponding grating vector with a grating frequency and direction. The directions of the grating vectors may vary as a function of the grating frequency. Different holograms in the set may diffract light in a particular direction so that the light emerges from a boundary of the grating medium in a single given direction regardless of wavelength. A prism may be used to couple light into the grating medium. The prism may be formed using materials having dispersion properties that are similar to the dispersion properties of the grating material. The prism may have an input face that receives perpendicular input light. The prism may include multiple portions having different refractive indices.

20 Claims, 11 Drawing Sheets

Related U.S. Application Data

(60) Provisional application No. 62/607,908, filed on Dec. 19, 2017.

(51) Int. Cl.
  *G02B 6/02* (2006.01)
  *G02B 6/28* (2006.01)
  *G02B 6/42* (2006.01)
  *G02B 27/09* (2006.01)

(52) U.S. Cl.
  CPC ..... *G02B 6/02057* (2013.01); *G02B 6/02076* (2013.01); *G02B 6/2848* (2013.01); *G02B 6/4204* (2013.01); *G02B 6/4214* (2013.01); *G02B 27/0172* (2013.01); *G02B 27/0972* (2013.01); *G02B 2027/0116* (2013.01); *G02B 2027/0174* (2013.01)

(58) Field of Classification Search
  CPC .... G02B 2027/0107; G02B 2027/0105; G02B 2027/0116; G02B 27/0172; G02B 27/0103; G02B 6/34; G02B 6/0016; G02B 6/0026; G02B 6/02057; G02B 6/02076; G02B 6/2848; G02B 6/4204; G02B 6/4214
  See application file for complete search history.

(56) References Cited

U.S. PATENT DOCUMENTS

| | | | |
|---|---|---|---|
| 7,502,168 B2 | 3/2009 | Akutsu et al. | |
| 7,764,413 B2 | 7/2010 | Levola | |
| 8,160,411 B2 | 4/2012 | Levola et al. | |
| 8,233,204 B1 | 7/2012 | Robbins et al. | |
| 8,446,675 B1 | 5/2013 | Wang et al. | |
| 8,665,178 B1 | 3/2014 | Wang | |
| 8,903,207 B1 | 12/2014 | Brown et al. | |
| 9,075,184 B2 | 7/2015 | Popovich et al. | |
| 9,341,846 B2 | 5/2016 | Popovich et al. | |
| 9,456,744 B2 | 10/2016 | Popovich et al. | |
| 11,119,261 B1 * | 9/2021 | Ayres | G02B 27/44 |
| 2004/0227923 A1 * | 11/2004 | Flagello | G02B 5/3058 355/53 |
| 2006/0268421 A1 * | 11/2006 | Shimizu | G02B 27/0172 359/630 |
| 2013/0250430 A1 | 9/2013 | Robbins et al. | |
| 2014/0140654 A1 | 5/2014 | Brown et al. | |
| 2014/0240843 A1 * | 8/2014 | Kollin | G02B 5/30 359/633 |
| 2016/0154150 A1 | 6/2016 | Simmonds et al. | |
| 2017/0031160 A1 | 2/2017 | Popovich et al. | |
| 2017/0276940 A1 | 9/2017 | Popovich et al. | |
| 2019/0094981 A1 | 3/2019 | Bradski et al. | |
| 2019/0113829 A1 * | 4/2019 | Waldern | G03B 21/147 |

FOREIGN PATENT DOCUMENTS

| | | | |
|---|---|---|---|
| JP | H11039706 A | | 2/1999 |
| JP | 2000019450 A | * | 1/2000 |
| JP | 2005062297 A | | 3/2005 |
| JP | 2005189677 A | | 7/2005 |
| JP | 2006126238 A | | 5/2006 |
| JP | 2007011279 A | | 1/2007 |
| JP | 2007052086 A | | 3/2007 |
| JP | 2017520013 A | | 7/2017 |
| WO | 2017077934 A1 | | 5/2017 |
| WO | 2017176389 A | | 10/2017 |
| WO | 2017176393 A1 | | 10/2017 |

\* cited by examiner

OPTICAL SYSTEM WITH DISPERSION COMPENSATION

This application is a continuation-in-part of U.S. patent application Ser. No. 16/609,716, filed Oct. 30, 2019, which is a national stage application, filed under 35 U.S.C. § 371, of International Patent Application No. PCT/US18/53192, filed Sep. 27, 2018, which claims the benefit of U.S. provisional patent application No. 62/607,908, filed on Dec. 19, 2017, each of which are hereby incorporated by reference herein in their entireties.

BACKGROUND

The present disclosure relates generally to optical devices, including dispersion compensation structures and methods for optical reflective devices having holographic optical elements.

Dispersion may cause chromatic aberrations in optical devices. These chromatic aberrations can have a degrading effect on an image of an optical reflective device. Accordingly, improved methods for correcting the effects of dispersion and optical reflective devices that mitigate the degrading effects of dispersion on reflected images are desired.

SUMMARY

The described features generally relate to one or more improved methods, systems, or devices for performing dispersion compensation. Holograms may be implemented within optical media as holographic optical elements. A holographic optical element may be substantially achromatic, sustaining a reflective angle independent of the wavelength of incident light. These holographic optical elements may be used in an optical device (e.g., an optical reflective device). Light traversing certain dispersion boundaries (e.g., air-to-projection coupling element, air-to-waveguide substrate, air-to-waveguide grating medium, waveguide substrate-to-air, waveguide grating medium-to-projection coupling element, waveguide grating medium-to-coupling element, etc.) of the optical device may exhibit waveform separation across disparate frequencies of the light.

A dispersion relationship between an index of refraction of one medium and an index of refraction of another medium for disparate frequencies may be used in techniques to compensate for chromatic dispersion of light in the optical device. Dispersion compensation techniques using the dispersion relationship may be applied to determine holograms that compensate for the chromatic dispersion effects of certain dispersion boundaries. A resulting holographic optical element may substantially approximate desired achromaticity associated with use of the holographic optical element in an optical device and/or a particular operating environment (e.g., where projection optics are used, where edge coupling is used, and/or in a fluid medium such as air or water).

In some examples, the holographic optical element includes a set of different holograms in a grating medium. Each hologram in the set may have a corresponding grating vector with a grating frequency (magnitude) and direction. The directions of the grating vectors may vary as a function of the grating frequency. Different holograms in the set may diffract light in a particular direction so that the light emerges from a boundary of the grating medium in a single given direction regardless of wavelength (e.g., perpendicular to the boundary). A prism may be used to couple light into the grating medium. The prism may be formed using materials having dispersion properties that are similar to the dispersion properties of the grating material. The prism may have an input face that receives perpendicular input light. The prism may include multiple portions having different refractive indices if desired. The prism may include two, three, or more than three stacked wedges formed from different materials. Interfaces (e.g., surfaces) between the wedges may be curved and/or tilted in multiple directions.

BRIEF DESCRIPTION OF THE DRAWINGS

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
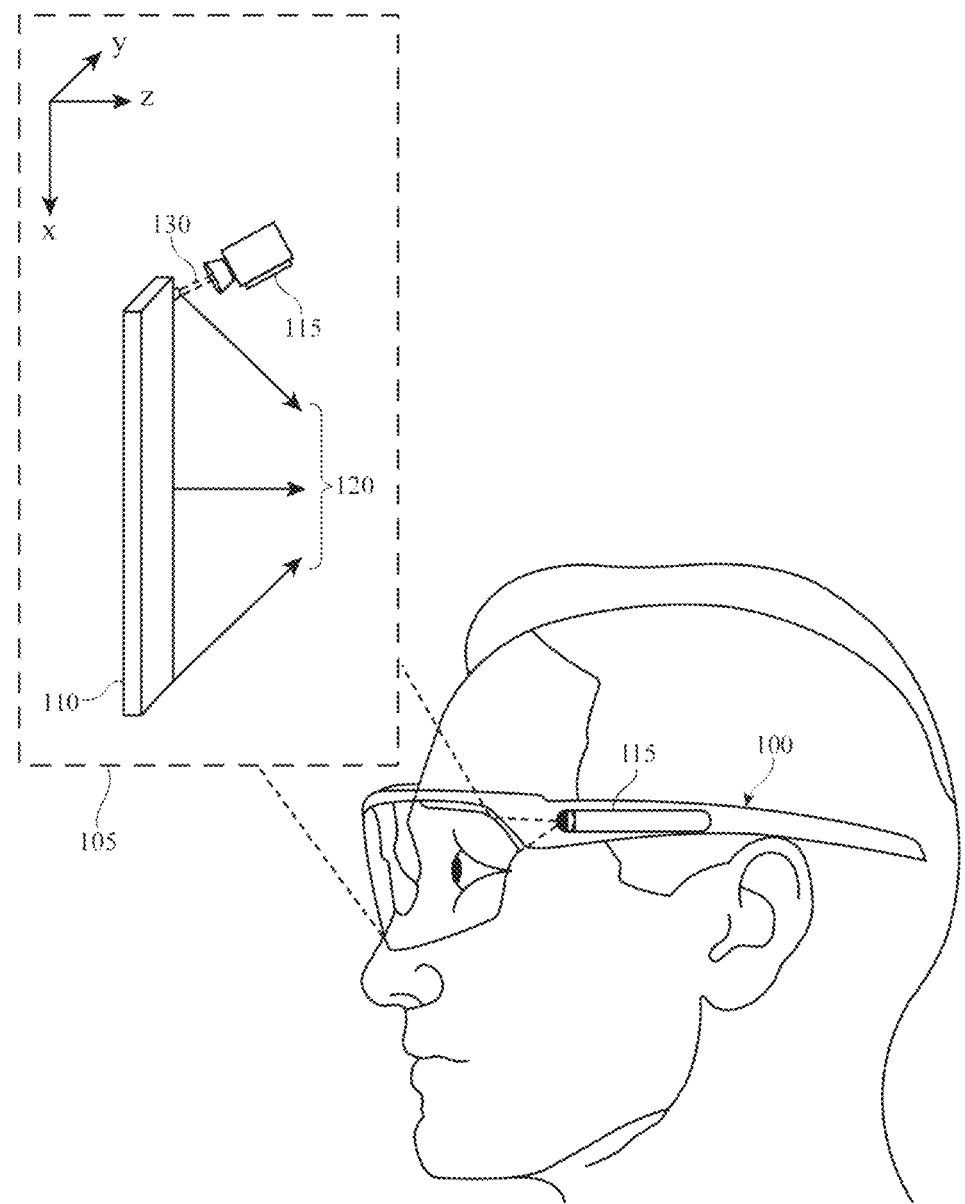
FIG. 1 is a diagram of an illustrative head mounted display (HMD) in which the principles included herein may be implemented in accordance with some embodiments.

An optical head-mounted display (HMD) is a wearable device that has the capability of reflecting projected images as well as allowing a user to experience augmented reality. Head-mounted displays typically involve near-eye optics to create "virtual" images. In the past HMDs have dealt with a variety of technical limitations that reduced image quality and increased weight and size. Past implementations have included conventional optics to reflect, refract or diffract light, however, the designs tend to be bulky. Additionally, conventional mirrors and grating structures have inherent limitations. For example, a conventional mirror may have a reflective axis that is necessarily coincident with surface normal. The reflective axis of a conventional mirror may lead to suboptimal orientation or performance of the mirror. Also, conventional grating structures may include multiple reflective axes that covary unacceptably with incidence angle and/or wavelength.

Accordingly, a device for reflecting light may include features that reflect light about a reflective axis not constrained to surface normal and whose angle of reflection for a given angle of incidence is constant at multiple wavelengths. Embodiments of the device may have substantially constant reflective axes (e.g., reflective axes that have reflective axis angles that vary by less than 1.0 degree) across a range of incidence angles for incident light of a given wavelength, and this phenomenon may be observed with incident light at various wavelengths.

Holographic optical elements may be used in head mounted devices or other systems and may be constructed from a recording medium. For example, a holographic optical element may be fabricated by deposition of a liquid medium mixture on or in the substrate structure, whereupon polymerization of matrix precursors within the medium mixture results in formation of a matrix polymer, which characterizes transition of the medium mixture to become a recording medium. The recording medium may be disposed between substrates and oriented for recording holograms on the recording medium. The recording medium may sometimes be referred to herein as a grating medium. The grating medium may be disposed between waveguide substrates. An input coupler such as a prism may couple light into the waveguide.

In practice, the grating medium may have a different bulk index of refraction as a function of wavelength than the waveguide substrates and the input coupler. This may produce dispersion of the in-coupled light in which the in-coupled light propagates at different angles as a function of wavelength within the grating medium. The holographic optical elements in the grating medium may be configured to reflect (diffract) the in-coupled light in a desired direction while compensating for this dispersion (e.g., so that light of each wavelength is reflected in the desired direction).

Aspects of the disclosure are initially described in the context of an apparatus for reflecting light towards an eye box situated at a fixed distance away from a skew mirror. Specific examples are described for apparatus including a grating medium. The grating medium may include one or more grating structures. A grating structure may be configured to reflect light of a particular wavelength about a reflective axis offset from a surface normal of the grating structure at a particular plurality of incident angles. Aspects of the disclosure are further illustrated by and described with reference to apparatus diagrams, system diagrams, and flowcharts that relate to light homogenization.

This description provides examples, and is not intended to limit the scope, applicability or configuration of implementations of the principles described herein. Various changes may be made in the function and arrangement of elements. Thus, various implementations may omit, substitute, or add various procedures or components as appropriate. For instance, it should be appreciated that the methods may be performed in an order different than that described, and that various steps may be added, omitted or combined. Also, aspects and elements described with respect to certain implementations may be combined in various other implementations. It should also be appreciated that the following systems, methods, devices, and software may individually or collectively be components of a larger system, wherein other procedures may take precedence over or otherwise modify their application.

FIG. 1 is an illustration of a head mounted display (HMD) 100 in which the principles included herein may be implemented. The HMD 100 may include eyewear or headwear in which a near-eye display (NED) 105 may be affixed in front of a user's eyes. The NED 105 may include a diffractive element portion disposed within or incorporated with a lens assembly of the HMD 100. In some examples, the diffractive element portion is a holographic optical element (HOE), which may be comprised of a skew mirror 110. Coordinates (x, y, and z-axis) are provided with reference to the skew mirror 110. The HMD 100 may include a light source or light projector 115 operatively coupled to the lens assembly. In some examples light source or light projector 115 may be operatively coupled to the lens assembly in a waveguide configuration. In some examples light source or light projector 115 may be operatively coupled to the lens assembly in a free space configuration.

The skew mirror 110 is a reflective device which may include a grating medium within which resides volume holograms or other grating structure. Skew mirror 110 may sometimes be referred to herein as volume holographic grating structure 110. The skew mirror 110 may include an additional layer such as a glass cover or glass substrate. The additional layer may serve to protect the grating medium from contamination, moisture, oxygen, reactive chemical species, damage, and the like. The additional layer may also be refractive index matched with the grating medium. The grating medium, by virtue of the grating structure residing therein, has physical properties that allow it to diffract light about an axis, referred to as a reflective axis, wherein angle of diffraction (henceforth referred to as angle of reflection) varies by less than 1° for multiple wavelengths of light incident upon the grating medium at a given angle of incidence. In some cases, the reflective axis is also constant for multiple wavelengths and/or angles of incidence. In some cases, the grating structure is formed by one or more holograms. The one or more holograms can be volume-phase holograms in some implementations. Other types of holograms may also be used in various implementations of the grating structure.

Similarly, implementations typically have substantially constant reflective axes (i.e., reflective axes have reflective axis angles that vary by less than 1°) across a range of incidence angles for incident light of a given wavelength, and this phenomenon may be observed with incident light at various wavelengths. In some implementations, the reflective axes remain substantially constant for every combination of a set of multiple incidence angles and a set of multiple wavelengths.

A hologram may be a recording of an interference pattern, and may include both intensity and phase information from the light used for the recording. This information may be recorded in a photosensitive medium that converts the interference pattern into an optical element that modifies the amplitude or the phase of subsequent incident light beams according to the intensity of the initial interference pattern. The grating medium may include a photopolymer, photorefractive crystals, dichromated gelatin, photo-thermo-refractive glass, film containing dispersed silver halide particles, or other material with the ability to react to and record an incident interference pattern. In some cases, coherent laser light may be used for recording and/or reading the recorded hologram.

In some cases, a hologram may be recorded using two laser beams known as recording beams. In some cases, the recording beams may be monochromatic collimated plane wave beams that are similar to each other except for angles at which they are incident upon the grating medium. In some implementations, the recording beams may have amplitude or phase distributions that differ from each other. The recording beams may be directed so that they intersect within the recording medium. Where the recording beams intersect, they interact with the recording medium in a way that varies according to the intensity of each point of the interference pattern. This creates a pattern of varying optical properties within the recording medium. For example, in some embodiments, a refractive index may vary within the recording medium. In some cases, the resulting interference pattern may be spatially distributed (e.g., with a mask or the like) in a manner that is uniform for all such grating structures recorded on the grating medium. In some cases, multiple grating structures may be superimposed within a single recording medium by varying the wavelength or the angle of incidence to create different interference patterns within the recording medium. In some cases, after one or more holograms are recorded in the medium, the medium may be treated with light in a post-recording light treatment. The post-recording light treatment may be performed with highly incoherent light to substantially consume remaining reactive medium components such as photoinitiator or photoactive monomer, such that photosensitivity of the recording medium is greatly reduced or eliminated. After recording of holograms or other grating structures in a recording medium has been completed, the medium is typically referred to as a grating medium. Grating mediums have typically been rendered non-photosensitive.

In some implementations, the grating structure includes a hologram generated by interference between multiple light beams referred to as recording beams. Typically, but not necessarily, the grating structure includes multiple holograms. The multiple holograms may be recorded using recording beams incident upon the grating medium at angles that vary among the multiple holograms (e.g., angle multiplexed), and/or using recording beams whose wavelengths vary among the multiple holograms (e.g., wavelength multiplexed). In some implementations, the grating structure includes a hologram recorded using two recording beams whose angles of incidence upon the grating medium vary while the hologram is being recorded, and/or whose wavelengths vary while the hologram is being recorded. Implementations further include a device wherein the reflective axis differs from surface normal of the grating medium by at least 1.0 degree; or at least by 2.0 degrees; or at least by 4.0 degrees; or at least by 9.0 degrees.

Light projector 115 may provide image-bearing light to the lens assembly. In some examples, the lens assembly and skew mirror 110 may be substantially flat with respect to the x-y plane; however, the lens assembly may include some curvature with respect to the x-y plane in certain implementations. Reflected light 120 from skew mirror 110 may be reflected towards an eye box situated at a fixed distance along the z-axis away from skew mirror 110. In some examples, skew mirror 110 may be contained at least partially within a waveguide. The waveguide may propagate incident light 130 by total internal reflection towards the skew mirror 110. In some examples, incident light 130 may propagate by free space towards skew mirror 110. The skew mirror 110 may include a grating medium made of a photopolymer. The skew mirror 110 may also include one or more grating structures within the grating medium. Each grating structure may include one or more holograms or sinusoidal volume gratings which may overlap with each other. In some embodiments, either holograms or non-holography sinusoidal volume gratings are used in the grating medium. In other embodiments, both holograms and non-holography sinusoidal volume gratings may be used in the same grating medium. A grating structure may be configured to reflect light of a particular wavelength about a reflective axis offset from a surface normal of the grating medium at a particular plurality of incidence angles. Each grating structure within the grating medium may be configured to reflect a portion of light toward an exit pupil in the eye box at a fixed distance from the waveguide.

Each grating structure (e.g., each volume hologram) may reflect light in a manner different from another grating structure. For example, a first grating structure may reflect incident light of a first wavelength at a first incidence angle, whereas a second grating structure may reflect incident light of a second wavelength at the first incidence angle (e.g., different grating structures may be configured to reflect different wavelengths of light for incident light of the same incidence angle). Also, a first grating structure may reflect incident light of a first wavelength at a first incidence angle, whereas a second grating structure may reflect incident light of the first wavelength at a second incidence angle (e.g., different grating structures may be configured to reflect the same wavelength of light for incident light of different incidence angles). Furthermore, a grating structure may reflect first incident light of a first wavelength and first incidence angle, and the grating structure may reflect second incident light at a second wavelength and second incidence angle about the same reflective axis. In this manner, different grating structures can be used to selectively reflect a particular wavelength of light for incident light at a given incidence angle. These different grating structures may be super-imposed within the grating medium of the skew mirror 110. The skew mirror 110 may have a substantially constant (uniform) reflective axis (e.g., each grating structure of the skew mirror 110 has a same substantially constant reflective axis).

In some examples, a head mounted display device may comprise a light source or light projector 115 for providing image-bearing light and a lens assembly. The lens assembly may include skew mirror 110. The lens assembly may comprise a light input section for receiving the image-bearing light from the light source or light projector 115. A waveguide may be disposed within the lens assembly and be operatively coupled to the light input section. The waveguide may comprise at least two substrates (not shown), a grating medium disposed between the at least two substrates, a first grating structure within the grating medium, and a second grating structure within the grating medium. In some examples, the waveguide may be omitted and the light source or light projector 115 may be operatively coupled to the lens assembly in a free space configuration. The first grating structure may be configured to reflect light of a wavelength about a first reflective axis of the first grating structure offset from a surface normal of the grating medium. The first grating structure may be configured to reflect light at a first incidence angle. The second grating structure may be configured to be at least partially non-overlapping with the first grating structure. The second grating structure may be configured to reflect light of the same wavelength as light reflected by the first grating structure. The second grating structure may be configured to reflect light of the wavelength about a second reflective axis of the second grating structure offset from the surface normal of the grating medium. The second grating structure may be configured to reflect light at a second incidence angle different from the first incidence angle.

FIG. 1 is merely illustrative and non-limiting. For example, an imaging component such as a light source (e.g., light source or light projector 115) may be provide image-bearing light. A waveguide component such as optical lens or the like may include a light input section. The light input section of the optical lens may receive the image-bearing light. A waveguide may be disposed within the optical lens and be operatively coupled to the light input section. In some cases, the waveguide may have a first waveguide surface and a second waveguide surface parallel to the first waveguide surface. The skew mirror may contain holograms that compensate for dispersion. A coupling component such as a light coupling device may be operatively coupled to the waveguide medium.

Additional examples and various implementations are contemplated using the light homogenizing techniques described herein.

Figure 2A:
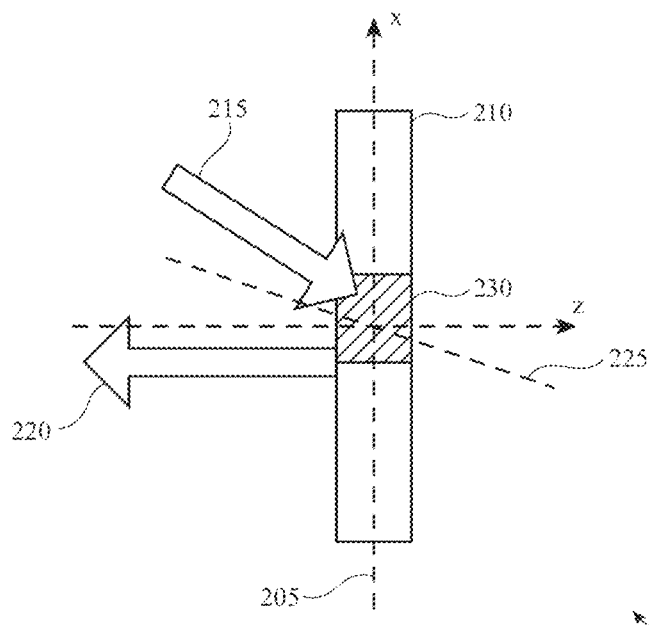
FIG. 2A is a diagram illustrating reflective properties of an illustrative skew mirror in real space in accordance with some embodiments.

FIG. 2A is a cross-section view 200 illustrating reflective properties of a skew mirror 210 in real space according to one example. The cross-section view 200 may include a grating structure such as hologram 230 in a grating medium. FIG. 2A omits skew mirror components other than the grating medium, such as an additional layer that might serve as a substrate or protective layer for the grating medium. The substrate or protective layer may serve to protect the grating medium from contamination, moisture, oxygen, reactive chemical species, damage, and the like. Implementations of a skew mirror for light coupling and/or pupil equalization may be partially reflective. For example, a skew mirror for dispersion compensation may be configured to reflect rays of light of different colors in a particular direction to compensate for dispersion associated with differences in the indices of refraction of the grating medium and the waveguide/input coupler. The skew mirror for dispersion compensation may include by varying the angle of the grating vectors in the skew mirror as a function of grating magnitude. The skew mirror 210 is characterized by the reflective axis 225 at an angle measured with respect to the z axis. The z axis is normal to the skew mirror axis 205. The skew mirror 210 is illuminated with the incident light 215 with an internal incidence angle that is measured with respect to the z axis. The principal reflected light 220 may be reflected with internal reflection angle 180° measured with respect to the z axis. The principal reflected light 220 may correspond to wavelengths of light residing in the red, green, and blue regions of the visible spectrum, as an example.

The skew mirror 210 is characterized by the reflective axis 225 at an angle measured with respect to the z-axis. The z-axis is normal to the skew mirror axis 205. The skew mirror 210 is illuminated with the incident light 215 with an internal incidence angle that is measured with respect to the z-axis. The principal reflected light 220 may be reflected with internal reflection angle axis substantially normal to the surface of skew mirror 210. In some examples, the principal reflected light 220 may correspond to wavelengths of light residing in the red, green, and blue regions of the visible spectrum. For example, the red, green, and blue regions of the visible spectrum may include a red wavelength (e.g., 610-780 nm) band, green wavelength (e.g., 493-577 nm) band, and blue wavelength (e.g., 405-492 nm) band. In other examples, the principal reflected light 220 may correspond to wavelengths of light residing outside of the visible spectrum (e.g., infrared and ultraviolet wavelengths).

The skew mirror 210 may have multiple hologram regions which all share substantially the same reflective axis 225. These multiple regions, however, may each reflect light for different ranges of angles of incidence. For example, the bottom third of a HOE containing the skew mirror 210 may only contain that subset of grating structures that reflects light upwards towards a corresponding eye box. The middle third may then reflect light directly towards the corresponding eye box. Then the top third need only contain the subset of grating structures which reflects light downwards to the corresponding eye box.

Figure 2B:
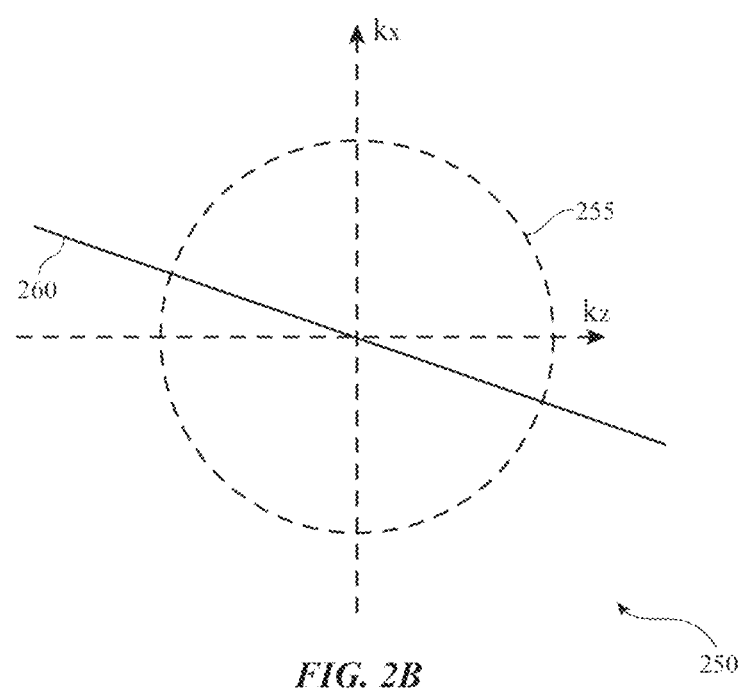
FIG. 2B illustrates an illustrative skew mirror in k-space in accordance with some embodiments.

FIG. 2B illustrates a k-space representation 250 of the skew mirror 210 of FIG. 2A. The k-space distributions of spatially varying refractive index components are typically denoted $\Delta n$ $\Delta n(\vec{k})$. $\Delta n(\vec{k})$ k-space distribution 260 passes through the origin, and has an angle measured with respect to the z-axis, equal to that of the reflective axis 225. Recording k-sphere 255 is the k-sphere corresponding to a particular writing wavelength. K-space 250 may include various k-spheres corresponding to wavelengths of light residing in the red, green, and blue regions of the visible spectrum.

The k-space formalism is a method for analyzing holographic recording and diffraction. In k-space, propagating optical waves and holograms are represented by three dimensional Fourier transforms of their distributions in real space. For example, an infinite collimated monochromatic reference beam can be represented in real space and k-space by equation (1):

$$E_r(\vec{r}) = A_r \exp(i \vec{k}_r \cdot \vec{r}) \xrightarrow{\mathfrak{F}} E_r(\vec{k}) = A_r \delta(\vec{k} - \vec{k}_r), \tag{1}$$

where $E_r(\vec{r})$ is the optical scalar field distribution at all $\vec{r} = \{x, y, z\}$ 3D spatial vector locations, and its transform $E_r(\vec{k})$ is the optical scalar field distribution at all $\vec{k} = \{k_x, k_y, k_z\}$ 3D spatial frequency vectors. $A_r$ is the scalar complex amplitude of the field; and $\vec{k}_r$ is the wave vector, whose length indicates the spatial frequency of the light waves, and whose direction indicates the direction of propagation. In some implementations, all beams are composed of light of the same wavelength, so all optical wave vectors must have the same length, i.e., $|\vec{k}_r| = k_n$. Thus, all optical propagation vectors must lie on a sphere of radius $k_n = 2\pi n_0/\lambda$, where $n_0$ is the average refractive index of the hologram ("bulk index"), and $\lambda$ is the vacuum wavelength of the light. This construct is known as the k-sphere. In other implementations, light of multiple wavelengths may be decomposed into a superposition of wave vectors of differing lengths, lying on different k-spheres.

Another important k-space distribution is that of the holograms themselves. Volume holograms usually consist of spatial variations of the index of refraction within a grating medium. The index of refraction spatial variations, typically denoted $\Delta n(\vec{r})$, can be referred to as index modulation patterns, the k-space distributions of which are typically denoted $\Delta n(\vec{k})$. The index modulation pattern created by interference between a first recording beam and a second recording beam is typically proportional to the spatial intensity of the recording interference pattern, as shown in equation (2):

$$\Delta n(\vec{r}\,) \propto |E_1(\vec{r}\,)+E_2(\vec{r}\,)|^2 = |E_1(\vec{r}\,)|^2+|E_2(\vec{r}\,)|^2+E^*_1(\vec{r}\,)E_2(\vec{r}\,)+E_1(\vec{r}\,)E^*_2(\vec{r}\,), \quad (2)$$

where $E_1(\vec{r}\,)$ is the spatial distribution of the first recording beam field and $E_2(\vec{r}\,)$ is the spatial distribution of the second recording beam field. The unary operator "*" denotes complex conjugation. The final term in equation (2), $E_1(\vec{r}\,)E^*_2(\vec{r}\,)$, maps the incident second recording beam into the diffracted first recording beam. Thus the following equation may result:

$$E_1(\vec{r})E_2^*(\vec{r}) \xrightarrow{\mathfrak{I}} E_1(\vec{k}) \otimes E_2(\vec{k}), \quad (3)$$

where $\otimes$ is the 3D cross correlation operator. This is to say, the product of one optical field and the complex conjugate of another in the spatial domain becomes a cross correlation of their respective Fourier transforms in the frequency domain.

Typically, the hologram 230 constitutes a refractive index distribution that is real-valued in real space. Locations of $\Delta n(\vec{k})$ k-space distributions of the hologram 230 may be determined mathematically from the cross-correlation operations $E_2(\vec{k})\otimes E_1(\vec{k})$ and $E_1(\vec{k})\otimes E_2(\vec{k})$, respectively, or geometrically from vector differences $\vec{K}_{G+}=\vec{k}_1-\vec{k}_2$ and $\vec{K}_{G-}=\vec{k}_2-\vec{k}_1$, where $\vec{K}_{G+}$ and $\vec{K}_{G-}$ are grating vectors from the respective hologram $\Delta n(\vec{k})$ k-space distributions to the origin (not shown individually). Note that by convention, wave vectors are represented by a lowercase "k," and grating vectors by uppercase "K."

Once recorded, the hologram 230 may be illuminated by a probe beam to produce a diffracted beam. For purposes of the present disclosure, the diffracted beam can be considered a reflection of the probe beam, which can be referred to as an incident light beam (e.g., image-bearing light). The probe beam and its reflected beam are angularly bisected by the reflective axis 225 (i.e., the angle of incidence of the probe beam relative to the reflective axis has the same magnitude as the angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\vec{k}\,) \propto \Delta n(\vec{k}\,)*E_p(\vec{k}\,)|_{|\vec{k}\,|=k_n}, \quad (4)$$

where $E_d(k)$ and $E_p(\vec{k}\,)$ are k-space distributions of the diffracted beam and the probe beam, respectively; and "*" is the 3D convolution operator. The notation "$|\vec{k}\,|=k_n$" indicates that the preceding expression is evaluated only where $|\vec{k}\,|=k_n$, i.e., where the result lies on the k-sphere. The convolution $\Delta n(\vec{k}\,)*E_p(\vec{k}\,)$ represents a polarization density distribution, and is proportional to the macroscopic sum of the inhomogeneous electric dipole moments of the grating medium induced by the probe beam, $E_p(\vec{k}\,)$.

Typically, when the probe beam resembles one of the recording beams used for recording, the effect of the convolution is to reverse the cross correlation during recording, and the diffracted beam will substantially resemble the other recording beam used to record a hologram. When the probe beam has a different k-space distribution than the recording beams used for recording, the hologram may produce a diffracted beam that is substantially different than the beams used to record the hologram. Note also that while the recording beams are typically mutually coherent, the probe beam (and diffracted beam) is not so constrained. A multi-wavelength probe beam may be analyzed as a superposition of single-wavelength beams, each obeying Equation (4) with a different k-sphere radius.

The term probe beam, sometimes used here when describing skew mirror properties in k-space, may be analogous to the term incident light, which is sometimes used here when describing skew mirror reflective properties in real space. Similarly, the term diffracted beam, sometimes used here when describing skew mirror properties in k-space, may be analogous to the term principal reflected light, sometimes used here when describing skew mirror properties in real space. Thus when describing reflective properties of a skew mirror in real space, it is sometimes stated that incident light is reflected by a hologram (or other grating structure) as principal reflected light, though to state that a probe beam is diffracted by the hologram to produce a diffracted beam says essentially the same thing. Similarly, when describing reflective properties of a skew mirror in k-space, it is sometimes stated that a probe beam is diffracted by a hologram (or other grating structure) to produce a diffracted beam, though to state that incident light is reflected by the grating structure to produce principal reflected light has the same meaning in the context of implementations of the present disclosure.

Generally, embodiments of skew mirrors contain a superposition of multiple diffraction gratings (holograms) that diffract, with mirror symmetry, incident light having relatively large wavelength and angular bandwidths. Theoretically, skew mirror embodiments can diffract the incident light with the same mirror symmetry across a range of incident angles and optical wavelengths, similar to how a real mirror reflects all light with the same symmetry. However, material dispersion can degrade the mirror-like performance of the skew mirror. Accordingly, techniques or devices that compensate for material dispersion may be highly desirable.

Figure 3:
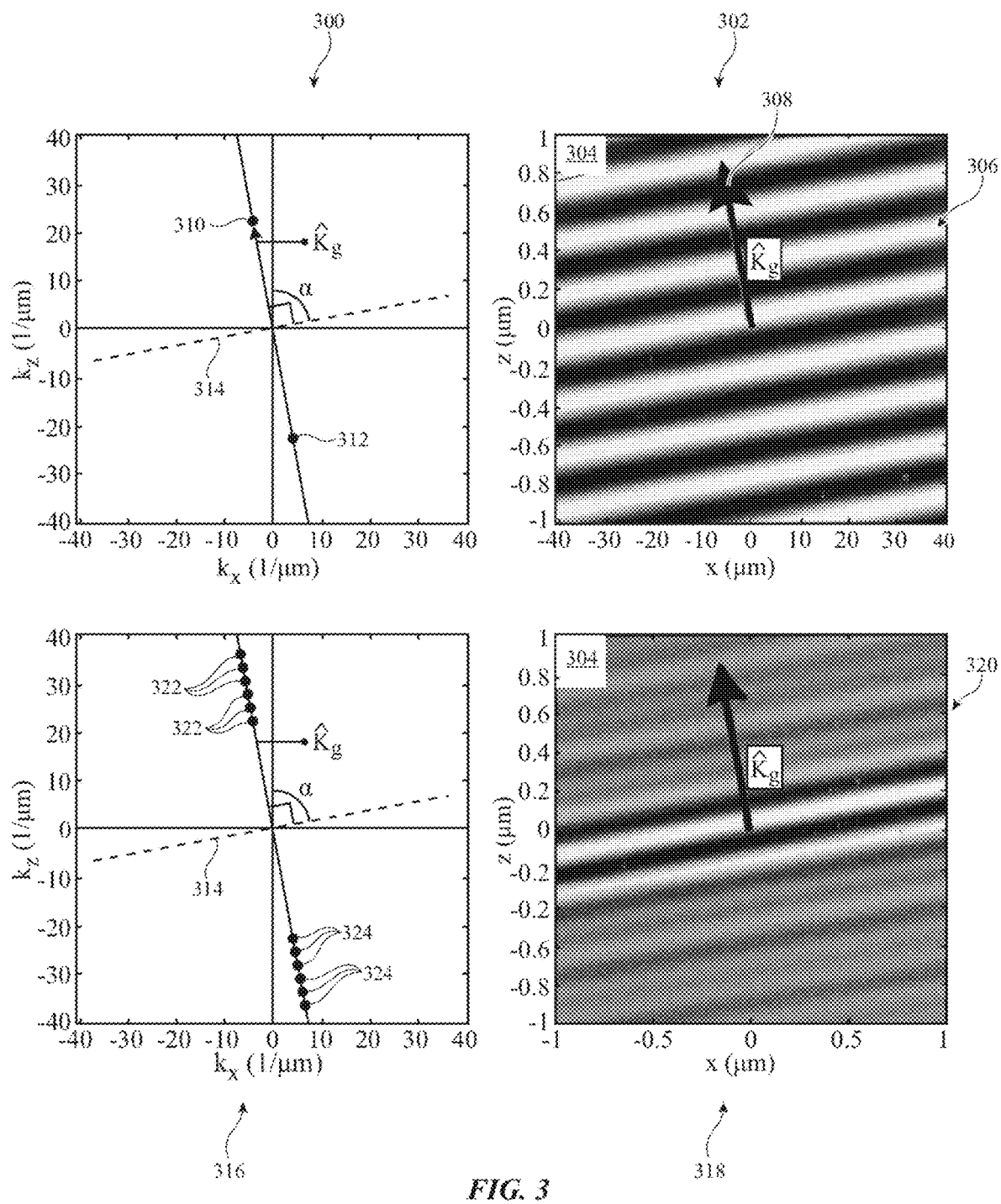
FIG. 3 is a diagram of illustrative skew mirrors in k-space and real space that may be oriented in a particular direction in accordance with some embodiments.

The skew mirrors described herein may be configured to compensate for the deleterious effects of material dispersion. For example, the skew mirrors may contain diffraction gratings (holograms) having varying directions as a function of grating frequency. Diffraction gratings typically have a spatially periodic structure that can diffract light. Diagram 300 of FIG. 3 shows a single exemplary diffraction grating in k-space. Diagram 302 shows the exemplary diffraction grating associated with diagram 300 in real (physical) space. As shown by diagram 302, diffraction grating 306 may be formed from a sinusoidal varying index of refraction in grating medium 304. The modulations in index of refraction may be oriented in a direction as shown by arrow 308. Arrow 308 represents the direction of the grating vector $\vec{K}_g$ for grating 306, which is sometimes referred to herein as grating direction (orientation) $\hat{K}_g$. Grating direction $\hat{K}_g$ is the unit vector of the grating vector $\vec{K}_g$ of grating 306, pointing in the direction orthogonal to the planes of constant indices of refraction in the grating (in real space).

In order to visualize the principle of skew mirrors having diffraction gratings such as grating 306 of diagram 302, it can be helpful to illustrate diffraction gratings in k-space (sometimes referred to herein momentum space). K-space is a Fourier transform of real space (e.g., as described above). Accordingly, a plane wave grating such as grating 306 illustrated in diagram 302 may be represented by two points 310 and 312 in k-space, as illustrated in diagram 300. The locations of points 310 and 312 in k-space are determined by the grating vector $\vec{K}_g$ of grating 306 (sometimes referred to herein as the momentum vector), which is given by Equation (5):

$$\vec{K}_g = \frac{2\pi}{\Lambda}\hat{K}_g = 2\pi F \hat{K}_g \qquad (5)$$

In Equation (5), $\Lambda$ is the period of the grating and F is the spatial frequency. Mirror plane 314 (sometimes referred to herein as mirror axis 314) is defined as the plane perpendicular to unit vector $\hat{K}_g$. Mirror plane 314 is oriented at an angle α with respect to the Z-axis of FIG. 3. If a skew mirror has no material dispersion or is to be used in a medium with the same material dispersion as the skew mirror itself, then the multiple diffraction gratings of the skew mirror will all have the same direction but varying magnitudes (e.g., varying spatial frequencies F).

Diagram 318 of FIG. 3 illustrates a simplified skew mirror having a set 320 of diffraction gratings (e.g., six overlapping/superimposed diffraction gratings) all with the same direction $\hat{K}_g$ but differing spatial frequencies F. Each of the diffraction gratings in set 320 lie within the same volume of grating medium 304. Each diffraction grating in set 320 is described by a corresponding point (grating vector) 322 and a corresponding point (grating vector) 324 in k-space diagram 316. As shown by diagram 316, each point 322 and each point 324 lie on the same line (e.g., in direction $\hat{K}_g$ perpendicular to mirror plane 314) at different magnitudes (e.g., grating frequencies F, as illustrated by distance from the origin). As described below, the combination of these parallel gratings will create a diffractive optical element that diffracts incident light with mirror symmetry, where the axis of mirror symmetry is orthogonal to the grating vector $\vec{K}_g$.

In an optical diffraction event, both energy and momentum are conserved. Static diffraction gratings do not possess energy, which means that the diffracted optical light will have the same wavelength as the incident light, because the energy of a photon $E_p$ is defined as $E_p = hc/\lambda$, where h is Planck's constant, c is the speed of light, and $\lambda$ is the optical wavelength. In k-space, light of constant energy or wavelength are represented by momentum surfaces defined by Equation (6):

$$\vec{k} = \frac{2\pi}{\lambda}\vec{n}(\phi, \theta). \qquad (6)$$

In Equation (6), $\vec{n}(\phi, \theta)$ is the optical index of a refraction as a function of propagation direction of the optical light, which is described by azimuthal angle $\phi$ and polar angle $\theta$. For optically isotropic media, the index of refraction is constant (e.g., $n_0$) in every direction, so the optical momentum surface becomes a sphere of radius $$k = \frac{2\pi}{\lambda}n_o.$$

Figure 4:
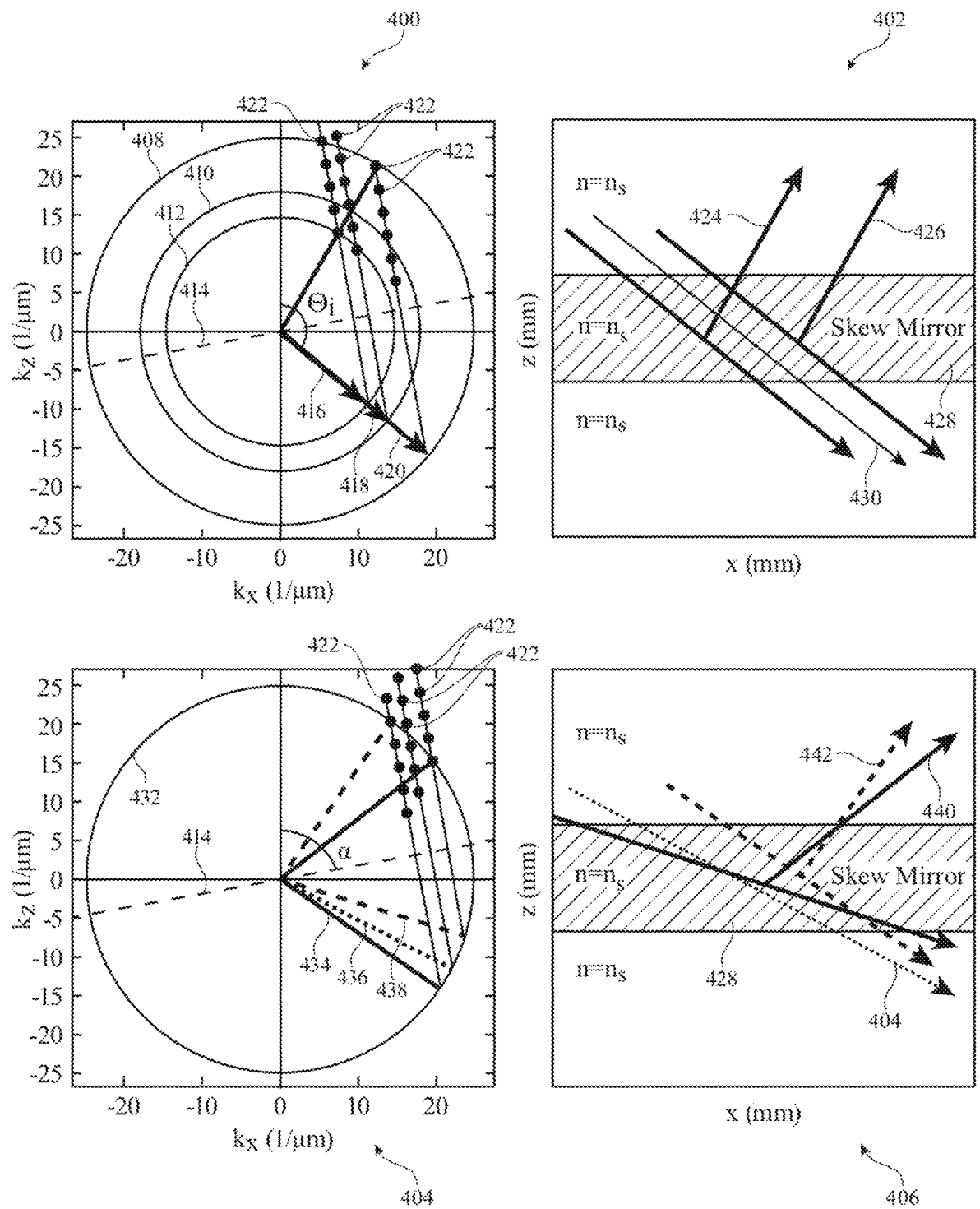
FIG. 4 is a diagram of an illustrative skew mirror in k-space and real space that shows how gratings in the skew mirror may be Bragg matched to some incident light in accordance with some embodiments.

Diagram 400 of FIG. 4 illustrates the cross-section of the optical momentum (k-space) surfaces in isotropic media for three different wavelengths. The largest surface 408 corresponds to the shortest wavelength (e.g., a wavelength of blue light), the second-largest surface 410 corresponds to the second shortest wavelength (e.g., a wavelength of green light), and the smallest surface 412 corresponds to the longest wavelength (e.g., a wavelength of red light), because the optical momentum vector $\vec{k}$ is inversely proportional to the wavelength $\lambda$.

In order for optical diffraction to occur, the summation of the grating vector $\vec{K}_g$ with the incident optical vector $\vec{k}_i$ must sum to an allowed mode of propagation $\vec{k}_d$, which is commonly known as Bragg matching, given by Equation (7):

$$\vec{k}_d = \vec{k}_i \pm \vec{K}_g. \qquad (7)$$

Bragg matching can be illustrated in k-space by placing the origin of the grating vectors at the tip of the optical momentum vector $\vec{k}_i$. FIG. 4 illustrates examples of Bragg matching with the skew mirror of FIG. 3. As shown by diagram 400 of FIG. 4, incident light from three different wavelengths but the same incident angle $\theta_i$ pass through the skew mirror, as shown by incident optical vectors (e.g., $\vec{k}_i$) 416, 418, and 420. The origin of the diffraction grating vectors 422 (e.g., diffraction grating vectors $\vec{K}_g$) are placed at the tips of the three different incident optical vectors 416, 418, and 420. Grating vectors 422 of FIG. 4 may, for example, correspond to points (grating vectors) 322 of diagram 316 in FIG. 3.

If the incident optical vector and a grating vector from the skew mirror are Bragg matched, then the incident light will be diffracted (reflected). For instance, the optical light associated with the red momentum surface (e.g., surface 412 in diagram 400) is Bragg matched with the smallest grating vector of the skew mirror (e.g., because the first solid point along grating vector 422 lies on surface 412), and will therefore diffract light (e.g., red light associated with incident optical vector 416). The other grating vectors (solid points) 422 in the skew mirror add with the incident optical vector 416 to solutions that are not allowed modes of propagation (e.g., the summations do not fall on the surface 412). Therefore, these gratings do not diffract the incident light associated with incident optical vector 416.

For the light represented by the green momentum surface (e.g., surface 410), none of the grating vectors are Bragg matched for that incident angle and wavelength. Therefore, the green incident light associated with incident optical vector 418 will propagate through the skew mirror without being diffracted, as shown by diagram 402 of FIG. 4. Finally, the light represented by the blue momentum surface (e.g., surface 408) is diffracted by the grating with the largest spatial frequency (e.g., because the largest magnitude grating vector 422 sums with incident optical vector 420 to a point on surface 408). This causes the red and blue light to be diffracted into the same angle, as shown by red light 424 and blue light 426 in diagram 402. This illustrates the achromatic performance of the skew mirror (e.g., skew mirror 428 of FIG. 4 and the skew mirror including the set of gratings 320 in FIG. 3). At the same time, green light 430 passes through skew mirror 428 without diffracting (e.g., because the green light is not Bragg matched to any of the gratings in skew mirror 428, as shown in diagram 400). In practice, the number of diffraction gratings in the skew mirror may be increased to further improve the spectral performance of the skew mirror.

Diagram 404 of FIG. 4 illustrates how light with the same optical wavelength (e.g., a wavelength associated with surface 432) but different incident angles (e.g., angles associated with incident optical vectors 434, 436, and 438) may interact with skew mirror 428. As shown in diagram 404, incident light associated with vectors 434 and 438 is Bragg matched with grating vectors 422 and will be diffracted, as shown by light 440 and 442 in real-space diagram 406. Incident light at some angles, such as incident light associated with incident optical vector 436 does not Bragg match any of the diffraction gratings in skew mirror 428, so the skew mirror will not diffract that light (e.g., as shown by light 444 in diagram 406). In the ideal scenario associated with FIG. 4, the skew mirror may diffract light of angular and wavelength bandwidth with mirror symmetry. Regardless of the incident angle and optical wavelength, the skew mirror will diffract the incident light symmetrically about the mirror plane 414 of skew mirror 428 (e.g., the axis orthogonal grating vector $\vec{K}_g$, corresponding to mirror plane 314 of FIG. 3).

Figure 5:
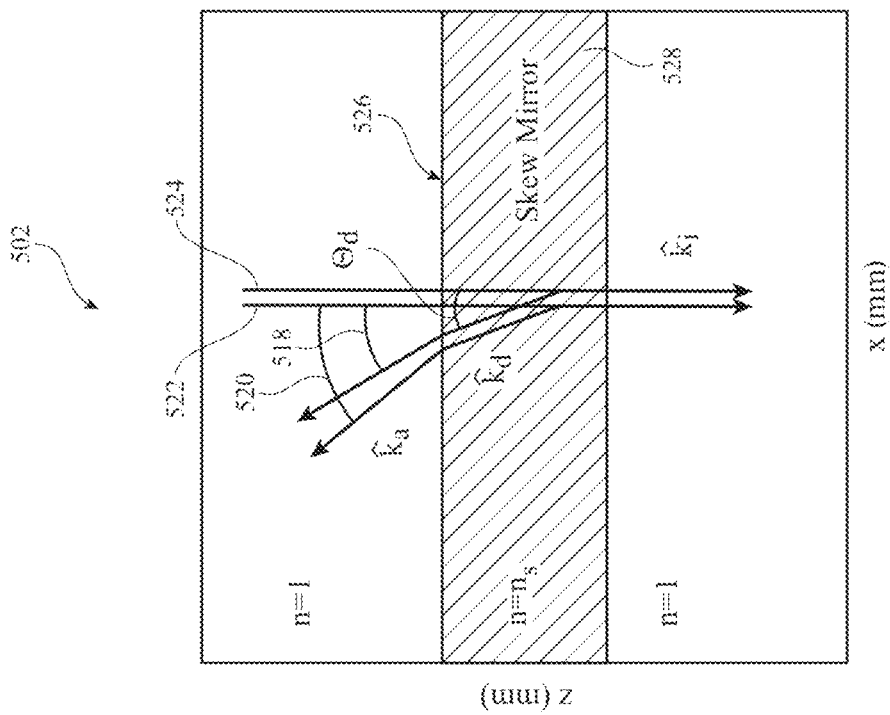
FIG. 5 is a diagram of an illustrative skew mirror in k-space and real space that may be subject to material dispersion in accordance with some embodiments.
Figure 5:
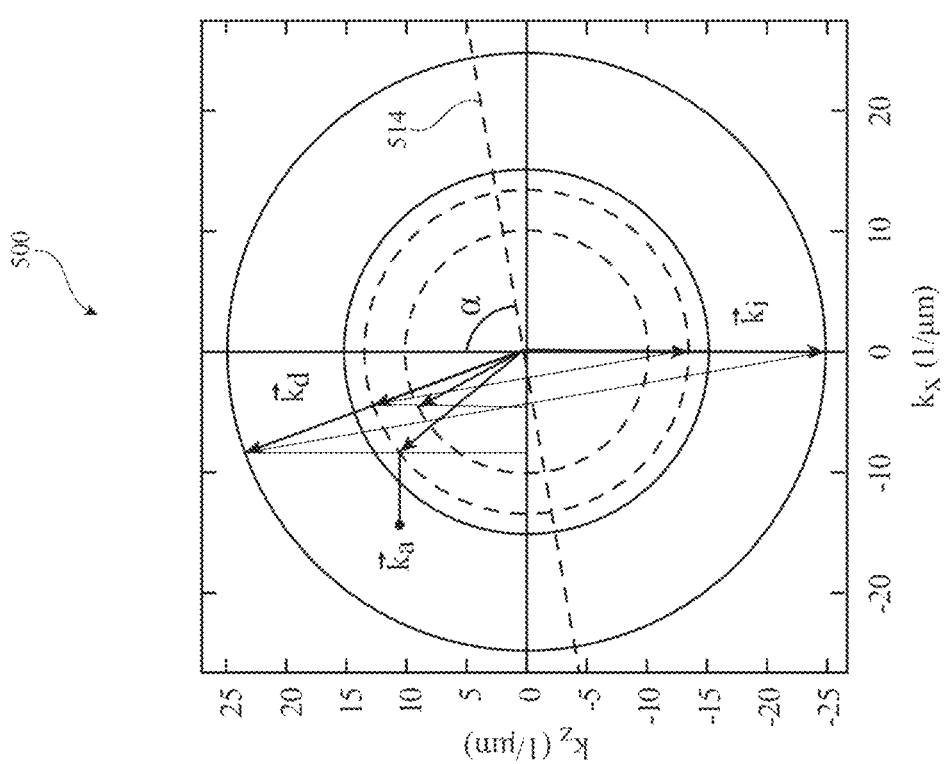

A skew mirror with parallel diffractive gratings will diffract incident light with mirror symmetry within the skew mirror media (e.g., the grating media) itself. However, the mirror symmetry will be violated once the diffracted light refracts into a media that has differing dispersion qualities. FIG. 5 illustrates such an example in which the skew mirror (e.g., skew mirror 528 of FIG. 5) is surrounded by free space and thus has a bulk index of n=1. For this example, 628 nm light 524 and 459 nm light 522 propagates in the $-\hat{z}$ direction (e.g., $\theta_i$=180 degrees) into the skew mirror, as shown in real space diagram 502. The incident light 524 and 522 is normal to the skew mirror surface 526, so refraction into the skew mirror can be ignored. Both wavelengths of light are diffracted by the skew mirror at diffracted light angle $\theta_d$=−20° (e.g., with the same diffracted light vector $\vec{k}_d$ as shown in diagram 500).

Note the incident and diffracted light are both 100 degrees from the mirror axis 514 at angle α, as shown in k-space diagram 500, thereby demonstrating the mirror symmetry of the skew mirror inside the skew mirror itself. For this example, the blue light (e.g., light 522) and the red light (e.g., light 524) are assigned indices of refraction of 1.6 and 1.5, respectively. When the diffracted light refracts into free space, blue light 522 refracts into an angle 520 of −38 degrees whereas red light 524 refracts into an angle 518 of −30.9 degrees (e.g., the diffracted light exiting skew mirror 528 at angles 520 and 518 exhibit optical momentum vectors $\vec{k}_a$ that are not aligned with diffracted light vector $\vec{k}_d$, as shown in diagram 500). In other words, the skew mirror can lose its mirror symmetry when the diffracted light is refracted into media that has different optical dispersion properties to the skew mirror itself. This can be problematic as many applications of the skew mirror will want to utilize the reflective properties of the skew mirror in air or other media and not in the skew mirror itself.

The deleterious effects of material dispersion can be compensated for by including non-parallel diffraction gratings (e.g., diffraction gratings having non-parallel grating vectors) in the skew mirror. This may configure the skew mirror to exhibit mirror symmetry in the surrounding media instead of in the skew mirror itself.

Figure 6:
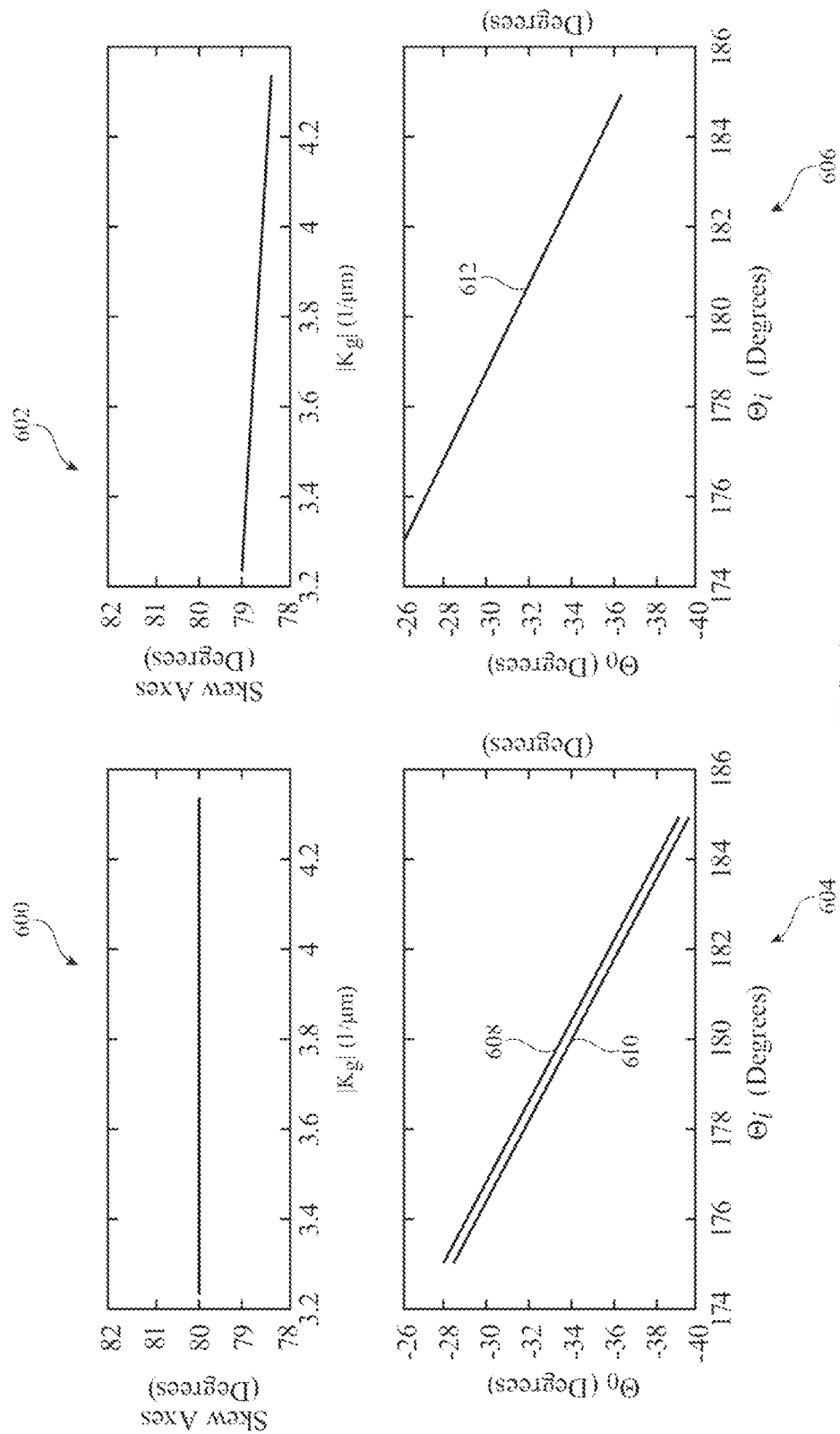
FIG. 6 are illustrative plots of skew mirror performance showing how an illustrative skew mirror of the type shown in FIG. 5 may be provided with gratings having skew axes that vary as a function of grating magnitude to compensate for material dispersion in accordance with some embodiments.

Graph 604 of FIG. 6 illustrates the performance of skew mirror 528 of FIG. 5 in an example where the skew mirror has a material dispersion of flint glass (NF2). Curve 610 of graph 604 plots diffracted angle $\theta_0$ (e.g., as refracted out of the skew mirror into surrounding media) as a function of incident angle $\theta_i$ for blue light 522 of FIG. 5. Curve 608 of graph 604 plots diffracted angle $\theta_0$ as a function of incident angle $\theta_i$ for red light 524 of FIG. 5. As shown by graph 604, the red and blue wavelengths are diffracted at angles that differ by about 0.5° across the incident field, thereby imparting undesirable chromatic effects on the skew mirror. Graph 600 plots the skew axis for each of the gratings in the skew mirror as a function of the corresponding grating magnitude $|K_g|$. As shown by graph 600, each of the gratings has a grating vector pointing in the same direction (e.g., with a skew/mirror axis of 80 degrees) regardless of grating frequency.

To reduce this chromatic behavior of the skew mirror, the grating directions in the skew mirror may vary as a function of grating frequency (grating vector magnitude). For example, an optimization that varies the angle of the skew mirror as a function of grating magnitude $|K_g|$ may be performed by optimizing a merit value M. Merit value M may, for example, be given by Equation 8:

$$M = \sum_{-FOV/2}^{FOV/2} (\theta_o^{red} - \theta_o^{blue})^2 \qquad (8)$$

In Equation 8, the sum is performed over the incident field of view, $\theta_o^{red}$ is the diffracted angle $\theta_0$ of red light (e.g., red light 524 of FIG. 5), and $\theta_o^{blue}$ is the diffracted angle $\theta_0$ of blue light (e.g., blue light 522 of FIG. 5). By optimizing the merit value, the skew axes of each grating in the skew mirror may be varied as a function of grating frequency, as shown by graph 602. Rather than exhibiting the same grating vector direction (e.g., unit vector $\hat{K}_g$), each grating vector (and thus the mirror/skew axes) in the skew mirror may vary based on its grating magnitude (grating frequency $|K_g|$). Graph 606 of FIG. 6 illustrates the diffracted angle versus incident angle for red and blue light (e.g., light 524 and 522 of FIG. 5) when the gratings are configured using grating directions (skew axes) associated with graph 602. As shown by line 612 on graph 606, the red and blue light diffraction responses converge such that the diffracted light is output from the skew mirror into surrounding media at substantially the same angle regardless of wavelength. For example, as shown by graph 606, the chromatic behavior of the skew mirror may reduce from an average of separation between the diffracted angles of the red and blue light from 0.5 degrees to 0.1 degrees or less. Therefore, adjusting the skew axis (direction) of the diffraction gratings (grating vectors) as a function of the grating frequencies in the skew mirror will improve its chromatic performance.

The example of FIG. 6 is merely illustrative and non-limiting. The method of optimization and the merit function can be redefined to change the final results. For instance, the merit function in Equation (8) did not depend on whether the skew mirror had the same mirror symmetry across the angular range or if the average skew axis was offset by a few degrees. Regardless of the merit function, adjusting the skew axis of the diffraction gratings as a function of the grating spatial frequency will allow for improvements in the skew mirror performance when material dispersion is at issue.

The effects of material dispersion can be further reduced by using an input prism that is cut such that the diffracted light that is normal to the skew mirror surface is also normal to the input face of the prism. In addition, matching the optical dispersion properties of the prism to the grating media may also reduce or mitigate deleterious dispersion effects.

Figure 7:
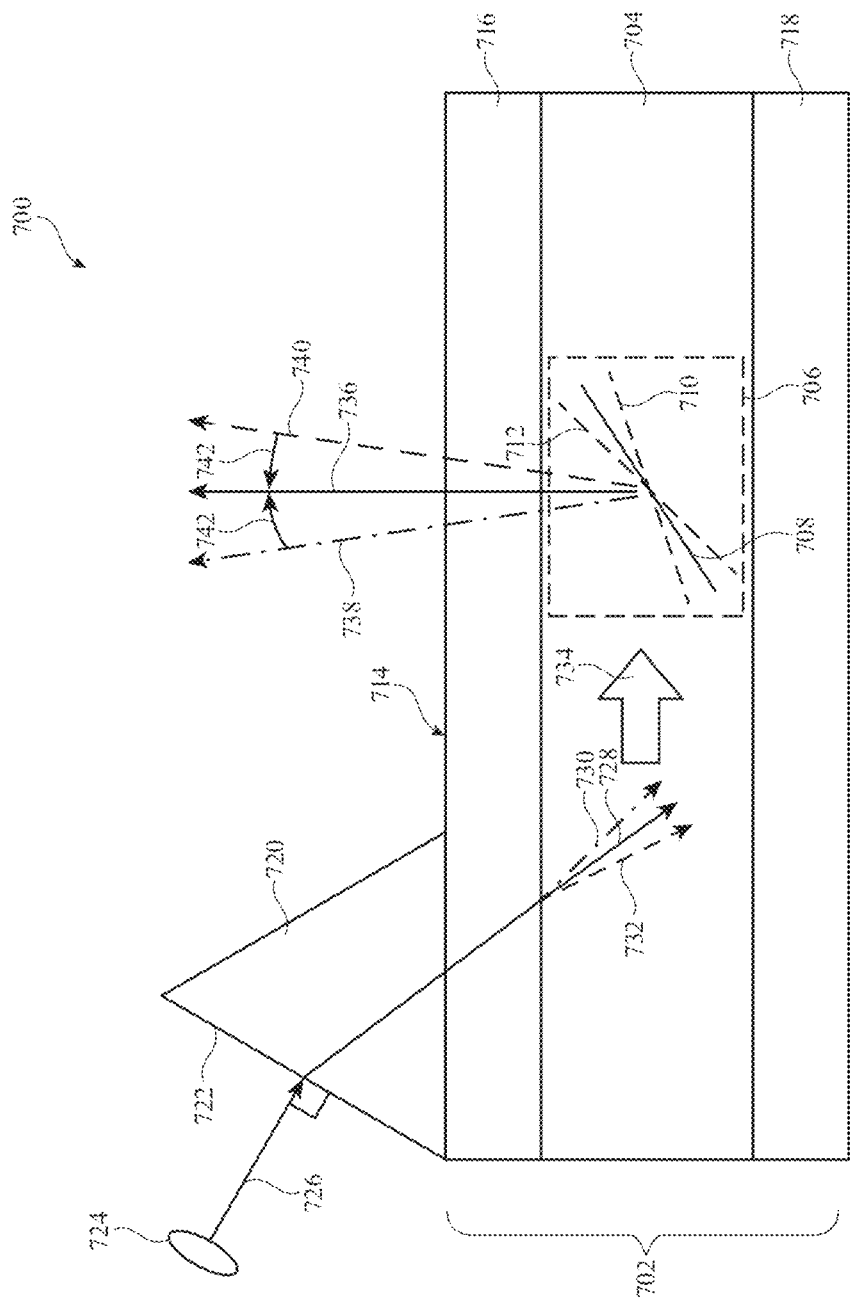
FIG. 7 is a side view of an illustrative input prism and an illustrative skew mirror having gratings with skew axes that vary as a function of grating magnitude to compensate for material dispersion in accordance with some embodiments.

FIG. 7 is a side view of a skew mirror that has been provided with dispersion mitigating gratings and a dispersion mitigating input prism. As shown in FIG. 7, system 700 (e.g., optical system 700, display system 700, holographic system 700, optical structures 700, etc.) may include a waveguide 702. Waveguide 702 may include waveguide substrates 716 and 718 and grating medium 704 sandwiched between the waveguide substrates. Input prism 720 may be mounted to surface 714 of waveguide substrate 716. This example is merely illustrative. In general, grating medium 704 need not be mounted within a waveguide, one or both of substrates 716 and 718 may be omitted, and/or input prism 720 may be mounted to the surface of grating medium 704.

Input prism 720 may receive input (image) light 726 from light source 724 (e.g., optical components such as lenses or other structures for collimating light from a light source onto prism 720). Prism 720 may have an input face 722 that is cut to extend perpendicular to input light 726. Prism 720 may couple light 726 into grating medium 704. Prism 720 and substrate 716 may be formed from materials having first dispersion properties (e.g., a first index of refraction as a function of wavelength, characterized by a first Abbe number). Grating medium 704 may have second dispersion properties (e.g., a second index of refraction as a function of wavelength, characterized by a second Abbe number) that is different from the first dispersion properties. This may cause some of the light 726 that was coupled into grating medium 704 to refract at different angles for different wavelengths, thereby splitting beam 726 into separate beams of different wavelengths. In the illustrative example of FIG. 7, light 726 is split into a first beam 728 (e.g., a green beam), beam 730 (e.g., a red beam), and beam 732 (e.g., a blue beam). Beams 728, 730, and 732 may propagate down the length of medium 704, as shown by arrow 734.

A skew mirror may be formed using grating medium 704. For example, the skew mirror may include a set of holograms (gratings) 706 within a given region of grating medium 704. In scenarios where the skew mirror does not perform dispersion compensation, the skew mirror may diffract beam 728 in a first direction, as shown by output beam 736, may diffract beam 730 in a second direction, as shown by output beam 740, and may diffract beam 732 in a third direction, as shown by output beam 738. To minimize this chromatic behavior, the set of gratings 706 may include gratings with grating directions (e.g., unit vectors $\hat{K}_g$) that vary as a function of their grating frequency $|K_g|$ (e.g., as given by graph 602 of FIG. 6). This may configure the set of gratings 706 to diffract beams 728, 730, and 732 in the same direction.

For example, the set of gratings 706 may include a first grating (hologram) that is Bragg matched to beam 728 (e.g., green light) and that has a first grating direction and thus a first skew angle (mirror axis) 708. Similarly, the set of gratings 706 may include a second grating (hologram) that is Bragg matched to beam 730 (e.g., red light) and that has a second grating direction and thus a second mirror axis 712. Finally, the set of gratings 706 may include a third grating (hologram) that is Bragg matched to beam 732 (e.g., blue light) and that has a third grating direction and thus a third mirror axis 710. Mirror axes 708, 710, and 712 may each be different (e.g., may each depend on the grating frequency of the corresponding grating in set 706). The first grating may diffract beam 728 in a first direction, as shown by arrow 736. The second grating may diffract beam 732 in the first direction, as shown by arrow 736. Similarly, the third grating may diffract beam 730 in the first direction, as shown by arrow 736. In other words, the varying grating directions in set 706 may collapse diffracted beams 738 and 740 into the direction of beam 736, as shown by arrows 742. This may reduce chromatic effects by directing light of each color to a desired location (e.g., an eye box). Direction 736 may be perpendicular to surface 714. By directing the output beams in direction 736 perpendicular to surface of grating medium 704 and by coupling light 726 into grating medium 704 through a face 722 cut perpendicular to the direction of light 726, material dispersion may be further minimized.

Figure 8:
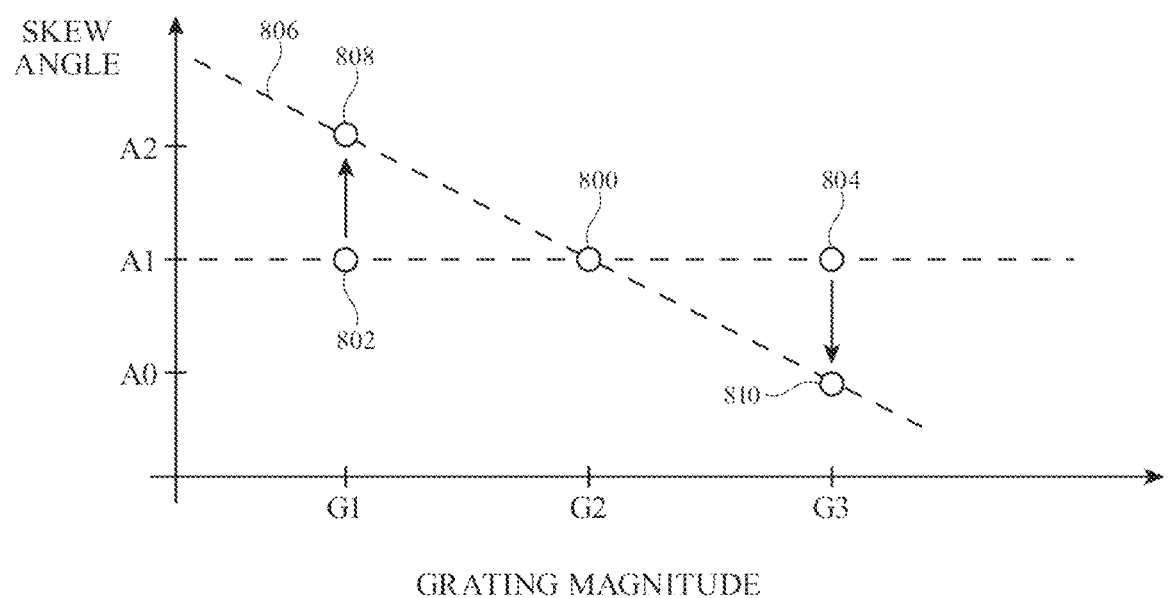
FIG. 8 is an illustrative plot as skew angle as a function of grating magnitude for an illustrative skew mirror of the type shown in FIG. 7 in accordance with some embodiments.

FIG. 8 is a plot of skew angle (mirror axis angle) as a function of grating magnitude (grating frequency) for the three gratings in set 706 shown in FIG. 7. As shown in FIG. 8, points 800, 804, and 802 plot the skew angles for first, second, and third diffraction gratings in set 706 of FIG. 7 without dispersion compensation. As shown in FIG. 8, each of the gratings has the same skew angle A1, leading to chromatic effects due to the divergence of beams 738, 736, and 740 of FIG. 7. When provided with dispersion compensation capabilities, the third grating may be provided with skew angle A2, as shown by point 808, and the second grating may be provided with skew angle A0, as shown by point 810. Angle A2 may correspond to mirror axis 712 of FIG. 7 and angle A0 may correspond to mirror axis 710 of FIG. 7, for example. The first grating may have grating magnitude G2, the second grating may have grating magnitude G1, and the third grating may have grating magnitude G3. By varying skew angle as a function of grating magnitude in this way (e.g., along non-horizontal line 806), each of the beams of light may be diffracted in the same direction regardless of color (e.g., in direction 736 of FIG. 7), thereby mitigating chromatic effects. The example of FIG. 8 is merely illustrative. Curve 806 may have other shapes if desired (e.g., curve 806 need not be linear and may be produced, for example, by optimizing a merit function).

Returning to FIG. 7, the dispersion compensation operations of system 700 of FIG. 7 may be further enhanced by, if desired, providing input prism 720 with similar dispersion characteristics to diffraction grating 704. For example, the Abbe number of the material used to form prism 720 may be selected to be relatively closely matched to the Abbe number of grating medium 704. For example, in a scenario where grating medium 704 has an Abbe number of 41.75 with an index of refraction of 1.515 (e.g., at the sodium D line), input prism 720 may be formed from titanate. Titanate has an Abbe number of 45.5 and an index of refraction of 1.548 (e.g., at the sodium D line). Thus, the Abbe number of titanate differs from the Abbe number of medium 704 by 4.05. This may allow the input prism to provide for improved chromatic performance relative to scenarios where a BK7 prism having an Abbe number of 64.17 with an index of refraction of 1.517 is used. In general, forming input prism 720 using any desired material having an Abbe number within a given threshold difference value of the Abbe number of grating medium 704 (e.g., with an index of refraction at the sodium D line within 0.1-0.2 of the index of refraction of medium 704) may serve to further enhance the chromatic performance of the system. The threshold difference value may be 20, 30, 25, 10, 5, 22.4, 5, 11, 5.5, between 10 and 30, between 10 and 25, or any other desired threshold.

Figure 9:
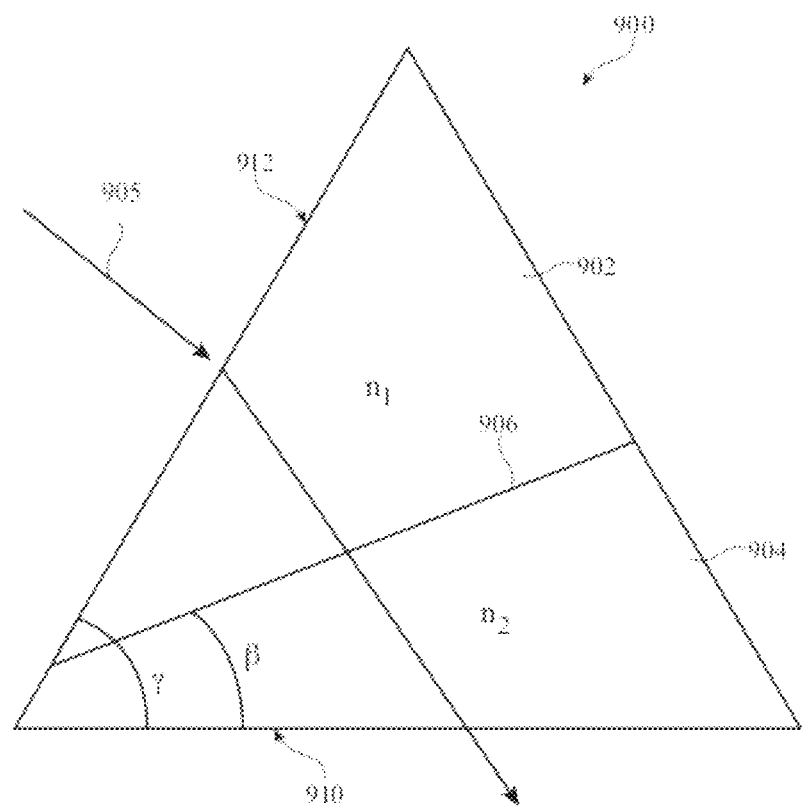
FIGS. 9-12 are side views of illustrative input prisms having different regions with different dispersion characteristics in accordance with some embodiments.

In another suitable arrangement, the chromatic performance of system 700 of FIG. 7 may be further improved by forming input prism 720 using multiple different materials. FIG. 9 is a side view of an input prism formed using multiple different materials. As shown in FIG. 9, input prism 900 (e.g., input prism 720 of FIG. 7) may include a first portion (wedge) 902 formed from a first material having a first index of refraction $n_1$. Prism 900 may include a second portion (wedge) 904 formed under first wedge 902. Wedge 904 may be formed from a second material having a second index of refraction $n_2$. In the example of FIG. 9, prism 900 is triangular, wedges 902 and 904 each have at least three sides and collectively define the triangular shape of the prism. This is merely illustrative and, if desired, prism 900, wedge 902, and/or wedge 904 may have other shapes.

Prism 900 may have a bottom surface 910 (e.g., a surface that contacts surface 714 or the grating medium of FIG. 7). Wedge 904 may have a surface 906 that contacts wedge 902 and that extends at angle β with respect to bottom surface 910. Wedge 902 may include coupling face (surface) 912 (e.g., surface 722 of FIG. 7) that receives input light 905 (e.g., from optical components 724 of FIG. 7). Coupling face 912 may extend at angle γ from bottom surface 910 (e.g., where angle γ is greater than angle β). Light 905 may refract at surface 912, 906, and/or 910 as it is coupled into the grating medium. Light 905 may not refract at surface 912 in scenarios where light 905 is provided to prism 900 perpendicular to face 912 (e.g., as shown by light 726 in FIG. 7). Angle γ, angle β, the material of wedge 902 (e.g., index of refraction $n_1$), and the material of wedge 904 (e.g., index of refraction $n_2$) may be selected to minimize dispersion and to optimize chromatic performance for the system. In some scenarios, prism 900 may sufficiently optimize chromatic performance and dispersion such that the grating structures in the grating medium need not have skew angles that vary as a function of grating frequency, for example.

Wedge 902 and wedge 904 may each be formed from material having an Abbe number between 40-50, between 43 and 47, or between 30 and 60, as a few examples. Angle γ may be between 50 and 70 degrees, between 55 and 65 degrees (e.g., approximately 60 degrees), or other angles. Angle β may be between 10 and 20 degrees, between 15 and 16 degrees, between 12 and 18 degrees, between 5 and 30 degrees, or other angles. Wedges 902 and 904 may have other shapes if desired.

Figure 10:
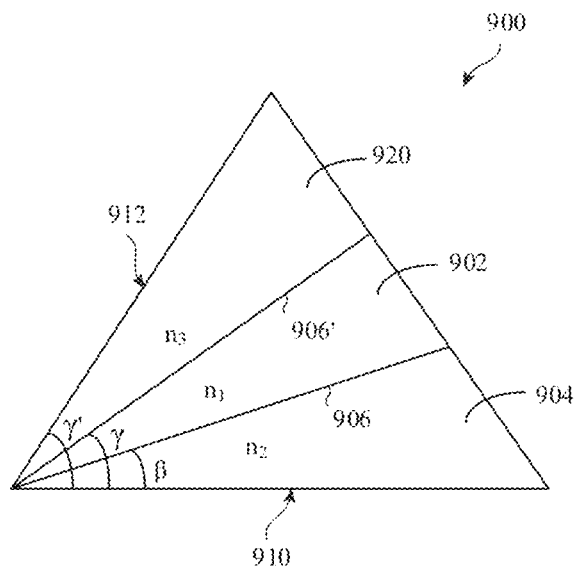

The example of FIG. 9 is merely illustrative. In general, prism 900 may include any desired number of wedges having different indices of refraction. FIG. 10 shows an example in which prism 900 has three wedges with different indices of refraction. As shown in FIG. 10, prism 900 may include a third wedge 920. Wedge 920 may have a surface 906' that contacts wedge 902 and may include coupling face 912. In this example, coupling face 912 of wedge 902 may extend at angle γ' from bottom surface 910 (e.g., an angle that is greater than angle γ). Wedge 920 may have index of refraction $n_3$ that is different from indices of refraction $n_1$ and $n_2$ or that is the same as index of refraction $n_2$. Angle γ', angle γ, angle β, the material of wedge 902 (e.g., index of refraction $n_1$), the material of wedge 904 (e.g., index of refraction $n_2$), and/or the material of wedge 920 (e.g., index of refraction $n_3$) may be selected to minimize dispersion and to optimize chromatic performance for the system. This example is merely illustrative. If desired, prism 900 may include more than the three wedges 920, 902, and 904. In general, prism 900 may include any desired number of stacked wedges of materials having different refractive indices.

Figure 11:
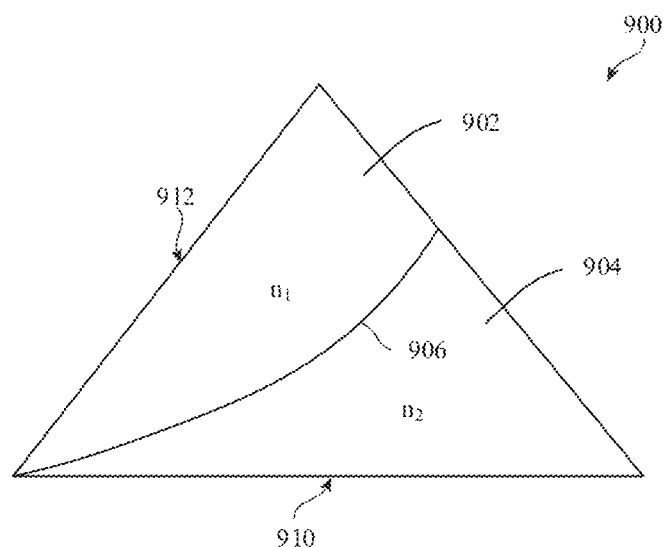

The examples of FIGS. 9 and 10 in which surface 906 is planar is merely illustrative. If desired, surface 906 may be curved. FIG. 11 is a diagram showing how surface 906 may be curved. As shown in FIG. 11, surface 906 may have a non-zero curvature. This may, for example, configure surface 906 to impart optical power on light 905 (FIG. 9) as the light passes through prism 900. Surface 906 may have any desired curvature (e.g., a spherical curvature, an aspheric curvature, a free form curvature, etc.). Surface 906 may be curved in multiple dimensions (e.g., surface 906 may be a three dimensionally curved surface having non-zero curvatures about multiple different axes). In scenarios where prism 900 includes more than two wedges, one, more than one, or each surface between the wedges may be curved (e.g., surfaces 906 and/or 906' of FIG. 10 may be curved).

Figure 12:
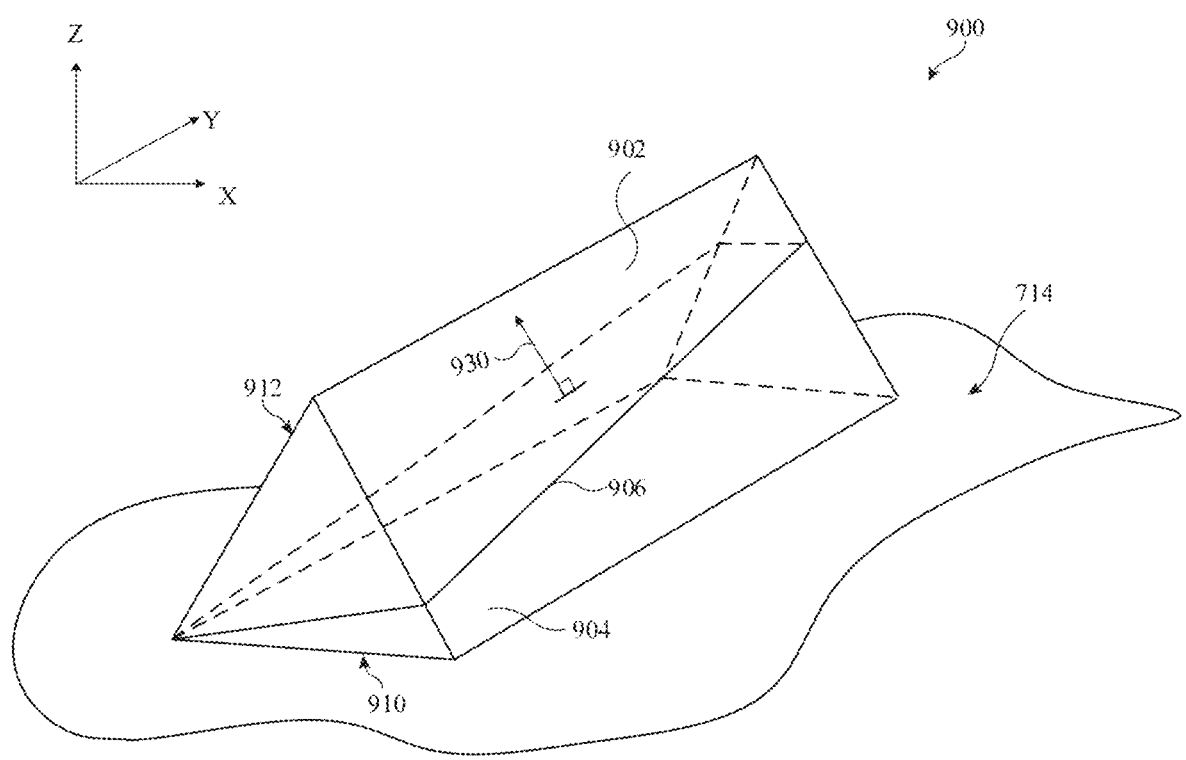

If desired, surface 906 may be tilted in more than one direction (e.g., including out of the plane of the page of FIGS. 9-11). FIG. 12 is a perspective view of an example of prism 900 in which surface 906 is tilted in more than one direction (e.g., out of the plane of the page of FIGS. 9-11). As shown in FIG. 12, surface 906 may have a normal axis 930. Normal axis 930 may be oriented at a non-zero angle with respect to the +Z axis (e.g., the normal axis of waveguide surface 714) within the X-Z plane in addition to being oriented at a non-zero angle with respect to the +Z axis within the Y-Z plane (e.g., where bottom surface 910 of prism 900 lies in the X-Y plane and is mounted to surface 714 of the underlying waveguide, and wherein the X-Y plane is perpendicular to the Y-Z plane and the X-Z plane). The X-Z and Y-Z planes may sometimes be referred to herein as normal planes of waveguide surface 714. This example is merely illustrative. In general, surface 906 may be tilted in any desired directions. The example of FIG. 12 in which surface 906 is planar is merely illustrative. If desired, surface 906 may be tilted in this way while also being curved (e.g., with a freeform curvature, a spherical curvature, and aspheric curvature, or any other desired curvature). In scenarios where prism 900 includes more than two wedges, each surface between the wedges may be tilted in multiple directions in this way (e.g., surfaces 906' and/or 906 may be tilted out of the plane of the page of FIG. 10 as shown in FIG. 12 and may be tilted in the same direction or in different directions) and/or may be curved (e.g., the arrangements of FIGS. 10-12 may be combined if desired).

While various embodiments have been described and illustrated herein, other means and/or structures for performing the function and/or obtaining the results and/or one or more of the advantages described herein may be used, and each of such variations and/or modifications is deemed to be within the scope of the embodiments described herein. More generally, all parameters, dimensions, materials, and configurations described herein are merely illustrative and actual parameters, dimensions, materials, and/or configurations may depend upon the specific application or applications for which the embodiments is/are used. The embodiments may be practiced in any desired combination. Also, various concepts may be embodied as one or more methods, devices or systems, of which an example has been provided. The acts performed as part of a method or operation may be ordered in any suitable way. Accordingly, embodiments may be constructed in which acts are performed in an order different than illustrated, which may include performing some acts simultaneously, even though shown as sequential acts in embodiments. As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. Transitional phrases such as "comprising," "including," "carrying," "having," "containing," "involving," "holding," "composed of," and the like are to be understood to be open-ended, i.e., to mean including but not limited to. The term "approximately," refers to plus or minus 10% of the value given.

The term "approximately" as used herein refers to plus or minus 10% of the value given. The term "about," refers to plus or minus 20% of the value given. The term "principally" with respect to reflected light, refers to light reflected by a grating structure. Light that is principally reflected at a recited angle includes more light than is reflected at any other angle (excluding surface reflections). Light that is principally reflected about a recited reflective axis includes more reflected light than is reflected about any other reflective axis (excluding surface reflections). Light reflected by a device surface is not included when considering principally reflected light. The term "reflective axis" refers to an axis that bisects an angle of incident light relative to its reflection. The absolute value of an angle of incidence of the incident light relative to the reflective axis is equal to the absolute value of the angle of reflection of the incident light's reflection, relative to the reflective axis. For conventional mirrors, the reflective axis is coincident with surface normal (i.e., the reflective axis is perpendicular to the mirror surface). Conversely, implementations of skew mirrors according to the present disclosure may have a reflective axis that differs from surface normal, or in some cases may have a reflective axis that is coincident with surface normal. A reflective axis angle may be determined by adding an angle of incidence to its respective angle of reflection, and dividing the resulting sum by two. Angles of incidence and angles of reflection can be determined empirically, with multiple measurements (generally three or more) used to generate a mean value.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to "diffract" incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The term "light" refers to electromagnetic radiation. Unless reference is made to a specific wavelength or range of wavelengths, such as "visible light," which refers to a part of the electromagnetic spectrum visible to the human eye, the electromagnetic radiation can have any wavelength. The terms "hologram" and "holographic grating" refer to a recording of an interference pattern generated by interference between multiple intersecting light beams. In some examples, a hologram or holographic grating may be generated by interference between multiple intersecting light beams where each of the multiple intersecting light beams remains invariant for an exposure time. In other examples, a hologram or holographic grating may be generated by interference between multiple intersecting light beams where an angle of incidence of at least one of the multiple intersecting light beams upon the grating medium is varied while the hologram is being recorded, and/or where wavelengths are varied while the hologram is being recorded (e.g., a complex hologram or complex holographic grating).

The term "sinusoidal volume grating" refers to an optical component which has an optical property, such as refractive index, modulated with a substantially sinusoidal profile throughout a volumetric region. Each (simple/sinusoidal) grating corresponds to a single conjugate vector pair in k-space (or a substantially point-like conjugate pair distribution in k-space). The term "diffraction efficiency" refers to the ratio of the power of reflected light to incident light and on a grating medium. The term "entrance pupil" refers to a real or virtual aperture passing a beam of light, at its minimum size, entering into imaging optics. The term "eye box" refers to a two-dimensional area outlining a region wherein a human pupil may be placed for viewing the full field of view at a fixed distance from a grating structure. The term "eye relief" refers to a fixed distance between a grating structure and a corresponding eye box. The term "exit pupil" refers to a real or virtual aperture passing a beam of light, at its minimum size, emerging from imaging optics. In use, the imaging optics system is typically configured to direct the beam of light toward image capture means. Examples of image capture means include, but are not limited to, a user's eye, a camera, or other photodetector. In some cases, an exit pupil may comprise a subset of a beam of light emerging from imaging optics.

The term "grating medium" refers to a physical medium that is configured with a grating structure for reflecting light. A grating medium may include multiple grating structures. The term "grating structure" refers to one or more gratings configured to reflect light. In some examples, a grating structure may include a set of gratings that share at least one common attribute or characteristic (e.g., a same wavelength of light to which each of the set of gratings is responsive). In some implementations, a grating structure may include one or more holograms. In other implementations, a grating structure may include one or more sinusoidal volume gratings. In some examples, the grating structures may be uniform with respect to a reflective axis for each of the one or more gratings (e.g., holograms or sinusoidal gratings). Alternatively or additionally, the grating structures may be uniform with respect to a length or volume for each of the one or more gratings (e.g., holograms or sinusoidal volume gratings) within the grating medium. Skew mirrors as described herein may sometimes also be referred to herein as grating structures, holographic grating structures, or volume holographic grating structures.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

In accordance with an embodiment, an optical device is provided that includes a waveguide having first and second waveguide substrates, a grating medium between the first and second waveguide substrates, a prism mounted to the first waveguide substrate, where the prism is configured to couple light into the grating medium, the grating medium has a first Abbe number, and the prism has a second Abbe number that is different from the first Abbe number, and a set of overlapping holograms in the grating medium, where the set of overlapping holograms is configured to direct a first wavelength of the light coupled into the grating medium in a given direction through a given one of the first and second waveguide substrates and is configured to direct a second wavelength of the light coupled into the grating medium in the given direction through the given one of the first and second waveguide substrates.

In accordance with any combination of the above embodiments, the given direction is perpendicular to a lateral surface of the first waveguide substrate.

In accordance with any combination of the above embodiments, the first wavelength includes red light and the second wavelength includes blue light.

In accordance with any combination of the above embodiments, the optical device further includes optical structures configured to provide the light to an input surface of the prism at an angle perpendicular to the input surface.

In accordance with any combination of the above embodiments, the set of overlapping holograms includes a first hologram having a first grating vector and a second hologram having a second grating vector that is oriented at a non-zero angle with respect to the first grating vector.

In accordance with any combination of the above embodiments, the set of overlapping holograms further includes a third hologram having a third grating vector that overlaps the first and second holograms and that is oriented at a non-zero angle with respect to the first and second grating vectors, where the first grating vector has a first magnitude, the second grating vector has a second magnitude different than the first magnitude, and the third grating vector has a third magnitude different than the first and second magnitudes.

In accordance with any combination of the above embodiments, the difference value between the first and second Abbe numbers is less than 30.

In accordance with any combination of the above embodiments, the difference value is less than 10.

In accordance with any combination of the above embodiments, the prism includes a first portion on the first waveguide substrate and having a first index of refraction at a given wavelength, and the prism comprises a second portion on the first portion and having a second index of refraction at the given wavelength that is different than the first index of refraction.

In accordance with any combination of the above embodiments, each hologram in the set of overlapping holograms has a respective grating vector with a corresponding grating frequency and a corresponding skew axis oriented at an angle, where the angle of the skew axes in the set of overlapping holograms varies as a function of the corresponding grating frequencies.

In accordance with another embodiment, an optical system is provided that includes a grating medium, a prism mounted to the grating medium, where the prism is configured to couple light into the grating medium, a first hologram in the grating medium having a first grating frequency and a first grating vector, wherein the first hologram is configured to diffract at least some of the light coupled into the grating medium in a given direction, a second hologram overlapping the first hologram in the grating medium and having a second grating frequency that is different from the first grating frequency and a second grating vector non-parallel to the first grating vector, where the second hologram is configured to diffract at least some of the light coupled into the grating medium in the given direction, and a third hologram overlapping the first and second holograms in the grating medium and having a third grating frequency that is different from the first and second grating frequencies and a third grating vector non-parallel to the first and second grating vectors, where the third hologram is configured to diffract at least some of the light coupled into the grating medium in the given direction.

In accordance with any combination of the above embodiments, the given direction is orthogonal to a lateral surface of the grating medium.

In accordance with any combination of the above embodiments, the optical system further includes optical structures configured to provide the light to an input face of the prism at an angle perpendicular to the input face.

In accordance with any combination of the above embodiments, the prism includes a first wedge and a second wedge on the first wedge, where the second wedge includes the input face, the first wedge has a first Abbe number, and the second wedge has a second Abbe number that is different than the first Abbe number.

In accordance with any combination of the above embodiments, the prism has a first Abbe number and the grating medium has a second Abbe number that is within 30 of the first Abbe number.

In accordance with any combination of the above embodiments, the grating medium is embedded in a waveguide and the prism is mounted to a surface of the waveguide.

In accordance with any combination of the above embodiments, the waveguide includes a substrate having a first Abbe number and the grating medium has a second Abbe number that is different than the first Abbe number.

In accordance with any combination of the above embodiments, the prism includes titanate.

In accordance with another embodiment, a head-mounted display device is provided that includes first and second substrates, a grating medium between the first and second substrates, a prism on the first substrate and configured to couple light into the grating medium through the first substrate, and a holographic optical element in the grating medium and configured to diffract the light coupled into the grating medium, where the prism includes a first portion on a surface of the first substrate that has a first Abbe number, and a second portion on the first portion that has a second Abbe number that is different than the first Abbe number.

In accordance with any combination of the above embodiments, the second portion includes an input face that is configured to receive the light, where the second portion is configured to convey the light to the grating medium through the first portion, the first portion has an upper surface that contacts the second portion, the upper surface is oriented at a first angle with respect to a bottom surface of the prism, and the input face is oriented at a second angle that is greater than the first angle with respect to the bottom surface of the prism.

The foregoing is merely illustrative and various modifications can be made to the described embodiments. The foregoing embodiments may be implemented individually or in any combination.

What is claimed is:
1. An electronic device comprising:
a waveguide having a waveguide substrate and a medium on the waveguide substrate;
a prism on the waveguide substrate and configured to couple light into the medium through the waveguide substrate, wherein the prism comprises:
a first wedge on a surface of the waveguide substrate, a second wedge on a surface of the first wedge, and a third wedge on a surface of the second wedge, wherein the third wedge has an input face configured to receive the light, the input face being non-parallel with respect to the surface of the waveguide substrate; and an optical coupler on the medium and configured to couple, out of the waveguide, the light coupled into the medium by the prism.

2. The electronic device of claim 1, wherein the third wedge is configured to convey the light to the medium through the second and first wedges, the surface of the first wedge contacts the second wedge, the surface of the second wedge contacts the third wedge, the surface of the first wedge is oriented at a first angle with respect to a bottom surface of the prism, the surface of the second wedge is oriented at a second angle that is greater than the first angle with respect to the bottom surface of the prism, and the input face is oriented at a third angle that is greater than the second angle with respect to the bottom surface of the prism.

3. The electronic device of claim 2, wherein the surface of the first waveguide substrate has a first normal axis, wherein the surface of the first wedge has a second normal axis, wherein the second normal axis is oriented at a first non-zero angle with respect to the first normal axis within a first plane, and wherein the second normal axis is oriented at a second non-zero angle with respect to the first normal axis within a second plane, the first plane being perpendicular to the second plane.

4. The electronic device of claim 3, wherein the surface of the first wedge is curved.

5. The electronic device of claim 4, wherein the surface of the second wedge is curved.

6. The electronic device of claim 3, wherein the surface of the second wedge is curved.

7. The electronic device of claim 3, wherein the surface of the second wedge has a third normal axis, wherein the third normal axis is oriented at a third non-zero angle with respect to the first normal axis within the first plane, and wherein the third normal axis is oriented at a fourth non-zero angle with respect to the first normal axis within the second plane.

8. The electronic device of claim 7, wherein the surface of the first wedge is curved.

9. The electronic device of claim 8, wherein the surface of the second wedge is curved.

10. The electronic device of claim 7, wherein the surface of the second wedge is curved.

11. The electronic device of claim 1, wherein the waveguide is configured to propagate the light coupled into the waveguide by the prism, via total internal reflection, to the optical coupler.

12. The electronic device of claim 1, wherein the prism has a first Abbe number and wherein the medium has a second Abbe number that is different from and within 30 of the first Abbe number.

13. An electronic device comprising:

a waveguide having a waveguide substrate and a medium on the waveguide substrate;

a prism on the waveguide substrate and configured to couple light into the medium through the waveguide substrate, wherein the prism comprises:

a first wedge mounted to a surface of the waveguide substrate, and a second wedge mounted to a surface of the first wedge, wherein the surface of the first wedge is curved, the second wedge has an input face configured to receive the light, and the input face is non-parallel with respect to the surface of the waveguide substrate; and an optical coupler on the medium and configured to couple, out of the waveguide, the light coupled into the medium by the prism.

14. The electronic device of claim 13, wherein the surface of the first wedge has a spherical curvature.

15. The electronic device of claim 14, wherein the surface of the first wedge has a freeform curvature.

16. The electronic device of claim 13, wherein the surface of the first wedge has a curvature that imparts an optical power to the light.

17. The electronic device of claim 13, wherein the prism has a first Abbe number and wherein the medium has a second Abbe number that is different from and within 30 of the first Abbe number.

18. An electronic device comprising:

a waveguide having a waveguide substrate and a medium on between the waveguide substrate;

a prism on the waveguide substrate and configured to couple light into the medium through the waveguide substrate, wherein the prism comprises:

a first wedge mounted to a surface of the waveguide substrate, wherein the surface of the first waveguide substrate has a first normal axis, and a second wedge mounted to a surface of the first wedge, wherein the surface of the first wedge has a second normal axis, the second normal axis is oriented at a first non- zero angle with respect to the first normal axis within a first plane, and the second normal axis is oriented at a second non- zero angle with respect to the first normal axis within a second plane, the first plane being perpendicular to the second plane; and an optical coupler on the medium and configured to couple, out of the waveguide, the light coupled into the medium by the prism.

19. The electronic device of claim 18, wherein the surface of the first wedge is curved.

20. The electronic device of claim 18, wherein the prism has a first Abbe number and wherein the medium has a second Abbe number that is different from and within 30 of the first Abbe number.

\* \* \* \* \*

UNITED STATES PATENT AND TRADEMARK OFFICE
CERTIFICATE OF CORRECTION

| | | |
|---|---|---|
| PATENT NO. | : 11,966,053 B2 | Page 1 of 1 |
| APPLICATION NO. | : 16/714530 | |
| DATED | : April 23, 2024 | |
| INVENTOR(S) | : Jonathan B. Pfeiffer et al. | |

It is certified that error appears in the above-identified patent and that said Letters Patent is hereby corrected as shown below:

In the Claims

Column 24, Line 30, Claim 18 "on between the" should read -- on the --

Signed and Sealed this
Third Day of December, 2024

*Katherine Kelly Vidal*

Katherine Kelly Vidal
*Director of the United States Patent and Trademark Office*